US011870044B2

(12) United States Patent
Smith et al.

(10) Patent No.: US 11,870,044 B2
(45) Date of Patent: Jan. 9, 2024

(54) METHODS AND DEVICES FOR ELECTROCHEMICAL RELITHIATION OF LITHIUM-ION BATTERIES

(71) Applicant: Alliance for Sustainable Energy, LLC, Golden, CO (US)

(72) Inventors: Kandler Alan Smith, Golden, CO (US); Shriram Santhanagopalan, Broomfield, CO (US); Nathaniel Alexander Sunderlin, Golden, CO (US); Andrew Michael Colclasure, Morrison, CO (US); Chunmei Ban, Golden, CO (US); Xuemin Li, Lakewood, CO (US); Judy C. Netter, Westminster, CO (US); Donal Patrick Finegan, Golden, CO (US); Kaitlin Elizabeth Fink, Lakewood, CO (US); Jaclyn Elizabeth Coyle, Westminster, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 155 days.

(21) Appl. No.: 17/514,004

(22) Filed: Oct. 29, 2021

(65) Prior Publication Data
US 2022/0149450 A1 May 12, 2022

Related U.S. Application Data

(60) Provisional application No. 63/107,713, filed on Oct. 30, 2020.

(51) Int. Cl.
*H01M 10/54* (2006.01)
*H01M 10/0525* (2010.01)
(Continued)

(52) U.S. Cl.
CPC .......... *H01M 10/54* (2013.01); *H01M 4/049* (2013.01); *H01M 4/139* (2013.01);
(Continued)

(58) Field of Classification Search
CPC ... H01M 10/54; H01M 4/139; H01M 10/0587
See application file for complete search history.

(56) References Cited

U.S. PATENT DOCUMENTS

| 6,136,477 A | 10/2000 | Gan et al. |
| 9,598,789 B2 | 3/2017 | Grant et al. |

(Continued)

FOREIGN PATENT DOCUMENTS

| WO | 2018/169830 A1 | 9/2018 |
| WO | 2018/187731 A1 | 10/2018 |

OTHER PUBLICATIONS

International Search Report and Written Opinion for International (PCT) Application No. PCT/US21/57182, dated Mar. 17, 2022, pp. 1-10.
(Continued)

*Primary Examiner* — Sarah A. Slifka
(74) *Attorney, Agent, or Firm* — Alexandra M. Hall

(57) ABSTRACT

Among other things, the present disclosure relates to re-purposing used lithium-ion batteries. The present disclosure includes treating an electrode using a solvent prior to electrochemically relithiating the electrode. In some embodiments, the relithiation may be done using a roll-to-roll device, wherein the electrode may be secured on a first pin and a second pin, then it may be unwound and submerged in an electrolyte solution. Lithium ions may be inserted into the electrode using a voltage. The layer of lithium may provide lithium ions to the electrode.

18 Claims, 15 Drawing Sheets

(51) Int. Cl.
H01M 4/04 (2006.01)
H01M 4/139 (2010.01)
H01M 10/0587 (2010.01)
H01M 4/86 (2006.01)

(52) U.S. Cl.
CPC ... H01M 10/0525 (2013.01); H01M 10/0587 (2013.01); *H01M 2004/8689* (2013.01)

(56) References Cited

U.S. PATENT DOCUMENTS

2010/0203366 A1 8/2010 Sloop
2019/0273290 A1 9/2019 Sloop

OTHER PUBLICATIONS

Abe et al., "Functional Electrolyte: Additives for Improving the Cyclability of Cathode Materials. Electrochem", Electrochemical and Solid-State Letters, 2004, vol. 7, No. 12, pp. A462-A465.

Abraham et al., "Diagnosis of power fade mechanisms in high-power lithium-ion cells", Journal of Power Sources, 2003, vols. 119-121, pp. 511-516.

Abraham et al., "Performance degradation of high-power lithium-ion cells—Electrochemistry of harvested electrodes", Journal of Power Sources, 2007, vol. 170, No. 2, pp. 465-475.

Choi et al., "Thermal reactions of lithiated graphite anode in LiPF6-based electrolyte", Thermochimica Acta, 2008, vol. 480, Nos. 1-2, pp. 10-14.

Fang et al., "Gradient Polarity Solvent Wash for Separation and Analysis of Electrolyte Decomposition Products on Electrode Surfaces", Journal of the Electrochemical Society, 2020, 167, 02056.

Fink et al., "Characterization of Aged Li-Ion Battery Components for Direct Recycling Process Design", Journal of the Electrochemical Society, 2019, vol. 166, No. 15, pp. A3775-A3783.

Fink et al.,"Impacts of Solvent Washing on the Electrochemical Remediation of Commercial End-Of-Life Cathodes", ACS Applied Energy Materials, 2020, vol. 3, No. 12, pp. 12212-12229.

Gachot et al., "Gas Chromatography/Fourier Transform Infrared/Mass Spectrometry Coupling: A Tool for Li-Ion Battery Safety Field Investigation", Analytical Methods, 2014, vol. 6, No. 15, pp. 6120-6124.

Grützke et al., "Supercritical carbon dioxide extraction of lithium-ion battery electrolytes", The Journal of Supercritical Fluids, 2014, vol. 94, pp. 216-222.

Mohanty et al., "Microstructural investigation of $Li_xNi1/3Mn1/3Co1/3O2$ ($x\leq1$) and its aged products via magnetic and diffraction study", Journal of Power Sources, 2012, vol. 220, pp. 405-412.

Nedjalkov et al., "Toxic Gas Emissions from Damaged Lithium Ion Batteries-Analysis and Safety Enhancement Solution", Batteries, 2016, vol. 2, No. 1, pp. 1-10.

Renfrew et al., "Altering Surface Contaminants and Defects Influences the First-Cycle Outgassing and Irreversible Transformations of $LiNi0.6Mn0.2Co0.2O2$", ACS Applied Materials & Interfaces, 2019, vol. 11, No. 38, pp. 34913-34921.

Shinova et al., "Cationic distribution and electrochemical performance of $Li Co1/3Ni1/3Mn1/3O2$ electrodes for lithium-ion batteries", Solid State Ionics, 2008, vol. 179, vol. 38, pp. 2198-2208.

Shui et al., "Degradation and revival of $Li—O2$ battery cathode", Electrochemistry Communications, 2013, vol. 34, pp. 45-47.

Sloop et al., "Advances in Direct Recycling of Lithium-Ion Electrode Materials", ECS Transactions, 2018, vol. 85, No. 13, pp. 397-403.

Somerville et al., "The Effect of Pre-Analysis Washing on the Surface Film of Graphite Electrodes", Electrochimica Acta, 2016, vol. 206, pp. 70-76.

Terborg et al., "Development of Gas Chromatographic Methods for the Analyses of Organic Carbonate-Based Electrolytes", Journal of Power Sources, 2014, vol. 245, pp. 836-840.

Waldmann et al., "Review—Post-Mortem Analysis of Aged Lithium-Ion Batteries: Disassembly Methodology and Physico-Chemical Analysis Techniques", Journal of the Electrochemical Society, 2016, vol. 163, No. 10, pp. A2149-A2164.

Wang et al., "New Additives to Improve the First-Cycle Charge-Discharge Performance of a Graphite Anode for Lithium-Ion Cells", Journal of the Electrochemical Society, 2005, vol. 152, No. 10, pp. A1996-A2001.

Williard et al., "Disassembly methodology for conducting failure analysis on lithium-ion batteries", Journal of Materials Science: Materials Electronics, 2011, vol. 22, vol. 10, pp. 1616-1630.

Yang et al., "An Effective Relithiation Process for Recycling Lithium-Ion Battery Cathode Materials", Advanced Sustainable Systems, Dec. 2019, pp. 1-6.

Zhang et al., "Electrochemical Relithiation for Direct Regeneration of $LiCoO2$ Materials from Spent Lithium-Ion Battery Electrodes", ACS Sustainable Chemistry & Engineering, 2020, vol. 8, pp. 11596-11605.

METHODS AND DEVICES FOR ELECTROCHEMICAL RELITHIATION OF LITHIUM-ION BATTERIES

CROSS-REFERENCE TO RELATED APPLICATIONS

This application claims priority from U.S. Provisional Patent Application No. 63/107,713 filed on Oct. 30, 2020, the contents of which are incorporated herein by reference in their entirety.

CONTRACTUAL ORIGIN

The United States Government has rights in this invention under Contract No. DE-AC36-08GO28308 awarded by the U.S. Department of Energy. The United States government has certain rights in this invention.

BACKGROUND

In the past decade, the number of electric vehicles (EV) on the roads has increased dramatically. Central to the successful design of EVs is energy storage, which is increasingly done by lithium-ion batteries (LIBs) because of their high charge-to-weight ratio, significant technical maturity, and rapidly decreasing production costs. The exponential increase in EVs will be mirrored by an exponential increase in spent (or used) LIBs, delayed only by the lifetime of the battery (approximately 10 years). One of the main capacity-fade mechanisms in LIBs is loss of available lithium ions from solid electrolyte interface (SEI) growth. This is a major fade mechanism for high energy density anode materials such as silicon and limits their practical utility. Generally, the capacity of a LIB decreases as the battery is cycled and lithium ions are depleted through SEI.

Pyrometallurgical and hydrometallurgical recycling are currently the most mature technologies for LIB recycling. In both methods, cathode active material, which contains the valuable and increasingly scarce elements cobalt, nickel, and lithium, is broken down into elemental (i.e., pyrometallurgical) or molecular (i.e., hydrometallurgical) form. These processes are highly energy intensive, costly, and typically require the use of toxic solvent extractions. Therefore, there remains a need for means for relithiating (i.e., recycling or repurposing) LIBs that is cost and resource effective and limits the use of energy-intensive smelters and environmentally problematic extractive solvents.

SUMMARY

An aspect of the present disclosure is a method for repurposing a lithium-ion battery, the method including, in order removing at least a portion of the electrode of the lithium battery, treating the portion of the electrode, recasting the portion of the electrode, and relithiating the electrode. In some embodiments, the electrode includes a cathode or a material capable of performing as a cathode. In some embodiments, the treating includes exposing the portion of the electrode to a solvent. In some embodiments, the solvent includes a ketone. In some embodiments, the ketone includes acetone. In some embodiments, the exposing includes at least one of sonicating, stirring, or soaking the portion of the electrode in the solvent. In some embodiments, the lithium-ion battery includes a layer of foil, and the removing includes scraping the electrode from the layer of foil, and/or the recasting includes attaching the electrode on the layer of foil. In some embodiments, the lithium-ion battery includes a wound or jelly roll design. In some embodiments, the relithiating includes securing a first end of the electrode to a first pin, securing a second end of the electrode to a second pin, positioning a chamber containing a layer of lithium and an electrolyte solution between the first pin and the second pin, extending at least a portion of the electrode through the chamber, and providing a voltage to the layer of lithium, wherein a terminal is configured to provide the voltage, the voltage is configured to motivate at least one lithium ion to move from the layer of lithium, through the electrolyte solution, and to the electrode.

An aspect of the present disclosure is a device for repurposing a jelly roll lithium-ion battery, the device including a first pin configured to secure a first end an electrode of the jelly roll lithium-ion battery, a second pin configured to secure a second end of the electrode, a chamber containing a layer of lithium and an electrolyte solution and positioned between the first pin and the second pin, and a terminal configured to provide a voltage to the layer of lithium, wherein at least a portion of the electrode is configured to extend through the chamber, and the voltage is configured to motivate at least one lithium ion to move from the layer of lithium, through the electrolyte solution, and to the electrode. In some embodiments, the electrode is a cathode or a material capable of performing as a cathode. In some embodiments, the electrolyte solution includes a lithium salt. In some embodiments, the lithium salt includes at least one of lithium chloride, lithium carbonate, lithium fluoride, lithium hexafluoride, lithium bis(trifluoromethanesulfonyl) imide, or lithium chlorate. In some embodiments, the device also includes a polymer positioned between the layer of lithium and the portion of the electrode. In some embodiments, the polymer includes at least one of polyethylene, polypropylene, or polystyrene. In some embodiments, the voltage is a constant voltage. In some embodiments, the constant voltage is in the range of about 1 V to about 10 V. In some embodiments, the chamber is made of a substantially inert and non-corrosive material. In some embodiments, the chamber is made of polytetrafluoroethylene (PTFE).

BRIEF DESCRIPTION OF THE DRAWINGS

Exemplary embodiments are illustrated in referenced figures of the drawings. It is intended that the embodiments and figures disclosed herein are considered to be illustrative rather than limiting.

FIG. 3A illustrates a constant current and constant voltage (CC-CV) charge protocol, FIG. 3B illustrates a CC-CV charge protocol with multiple cycles, and FIG. 3C illustrates a multi-step current and multi-step voltage charge protocol, according to some aspects of the present disclosure.

FIG. 5A shows washing condition only, and FIG. 5B shows washing followed by electrochemical relithiation, according to some aspects of the present disclosure, according to some aspects of the present disclosure.

REFERENCE NUMERALS

Figure 1A:
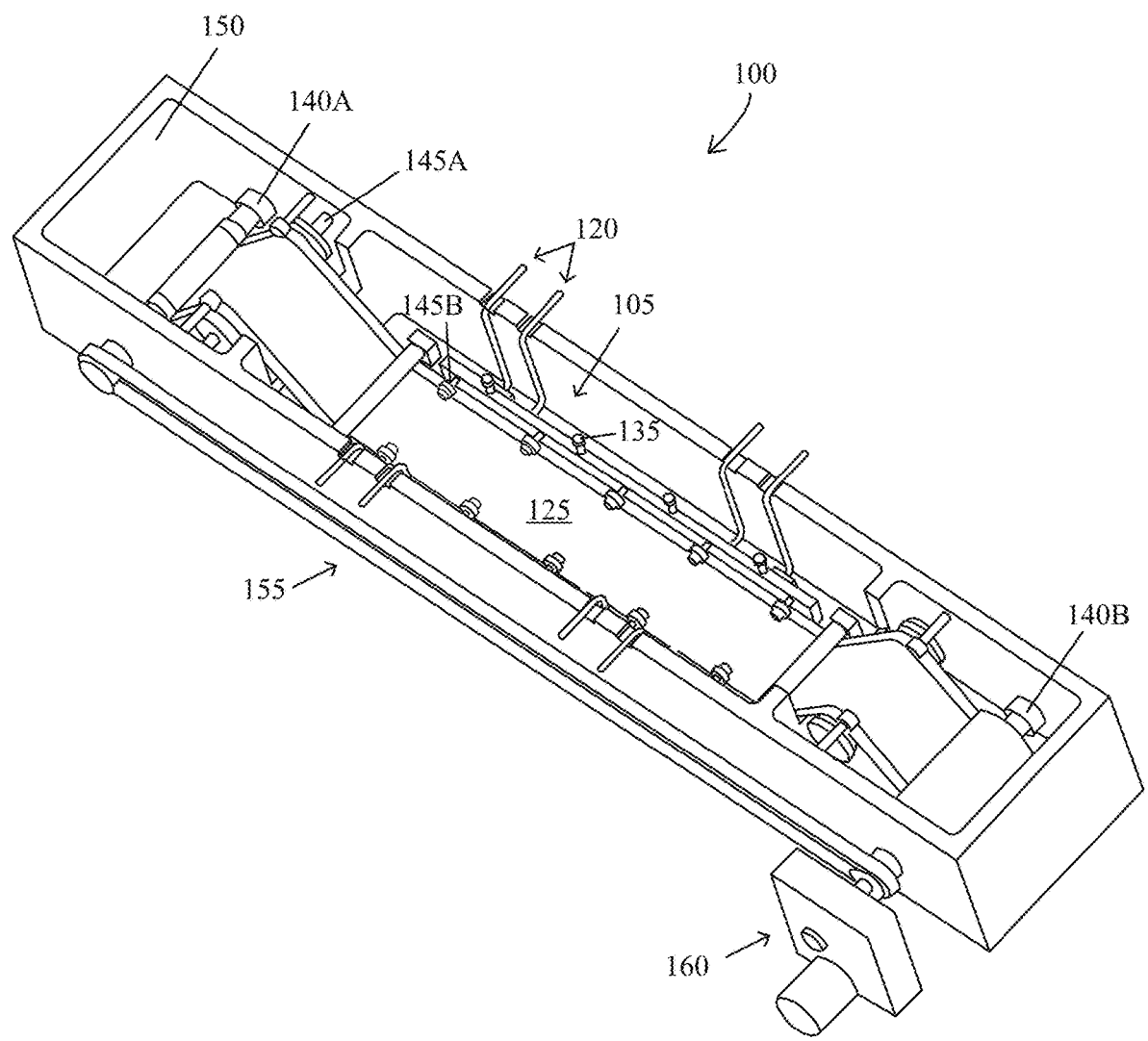
FIG. 1A illustrates an isometric view of a roll-to-roll device for repurposing a lithium-ion battery, according to some aspects of the present disclosure.

100 . . . roll to roll device
105 . . . chamber
110 . . . layer of lithium
115 . . . polymer
120 . . . terminal
125 . . . electrode
130 . . . electrolyte solution
135 . . . spring
140 . . . pin
145 . . . wheel
150 . . . container
155 . . . belt
160 . . . motor
165 . . . plate
200 . . . method
205 . . . removing
210 . . . treating
215 . . . recasting
220 . . . relithiating

DETAILED DESCRIPTION OF SOME EMBODIMENTS

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

As used herein, "electrode" may refer to an anode, a cathode, a material which may act as an anode, a material which may act as a cathode, and/or a substantially conductive material for use in lithium-ion battery (LIB) applications. The term "electrode" may refer to the entirety of an anode, a cathode, or a material which may act as an anode or a cathode or may refer to only a portion of an anode, a cathode, a material which may act as an anode or cathode, or a substantially conductive material. The LIBs may be lithium cobalt oxide (LCO), lithium manganese oxide (LMO), lithium iron phosphate (LFP), lithium nickel manganese cobalt (NMC), lithium nickel cobalt aluminum oxide (NCA), lithium titanate (LTO), or others. The LIBs may be wound (i.e., "jelly roll" or Swiss roll), pouch, or coin LIBs, unless otherwise indicated. As used herein "cell" may refer to an electrode of a LIB.

Among other things, the present disclosure relates to methods and devices for re-purposing used lithium-ion batteries, which may include inserting active lithium ions into LIB electrodes. The methods described herein may include treating an electrode of the LIB using a solvent prior to electrochemically relithiating the electrode. In some embodiments, the re-lithiation may be done using a roll-to-roll device, wherein an electrode may be secured on a first pin, then it may be unwound and run through an electrolyte solution to relithiate the electrode. Within the electrolyte solution, lithium ions may be inserted into the electrode using external current and/or voltage control provided by at least one terminal. One or multiple passes through the roll-to-roll device may be used for the electrode running through the electrolyte solution. The layer of lithium may act as a sacrificial electrode by providing lithium ions to the electrode. The techniques described herein may be useful for relithiating used LIBs (i.e., electrode recycling), addressing over-lithiation of electrodes, and/or providing the ability to recycle high-capacity electrodes.

Figure 1B:
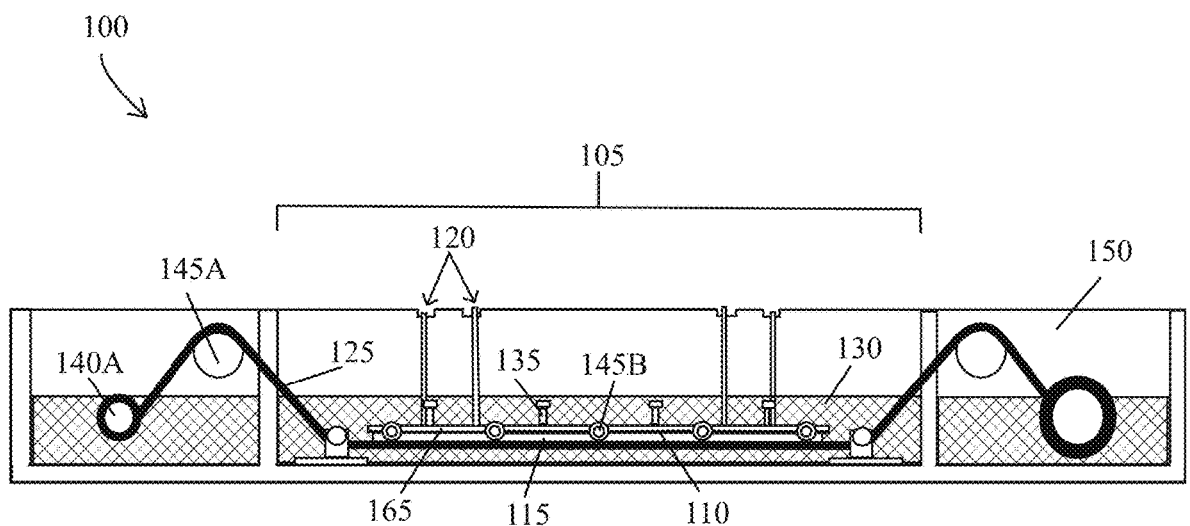
FIG. 1B illustrates a cut-away side view of a roll-to-roll device for repurposing a lithium-ion battery, according to some aspects of the present disclosure.

FIG. 1A illustrates an isometric view and FIG. 1B illustrates a cut-away side view of a roll-to-roll device 100 for repurposing a lithium-ion battery, according to some aspects of the present disclosure. In the roll-to-roll device 100, at least a portion of an electrode 125 of a wound or "jelly roll" LIB may be secured (i.e., wound around) to a first pin 140A. A layer of lithium 110 and at least one terminal 120 may be positioned within a chamber 105. The terminal 120 may be capable of providing a voltage in the chamber 105. At least a portion of the electrode 125 may be unwound from the first pin 140A and extended within the chamber 105 and secured to a second pin 140B. An electrolyte solution 130 (shown in FIG. 1B but not FIG. 1A) may be present in the chamber 105. When the voltage is applied by the terminal 120, lithium ions may travel from the layer of lithium 110 to the electrode 125 through the electrolyte solution 130.

In some embodiments, the first pin 140A and/or the second pin 140B may be positioned on either side of the chamber 105. The first and second pins 140A and 140B may be substantially cylindrical such as rollers or dowel rods. A first portion of the lithium-ion battery may be secured using the first pin 140A and a second portion of the lithium-ion battery may be secured using the second pin 140B. That is, at least a portion of the electrode 125 may be rolled or wound around the first pin 140A and/or the second pin 140B. The electrode 125 may extend between the first pin 140A and the second pin 140B. The first pin 140A and the second pin 140B may be capable of rotating, such that the electrode 125 may move from the first pin 140A to the second pin 140B. The rotating of the first pin 140A and the second pin 140B may result in at least a portion of the electrode 125 being rolled or wound-up around the first pin 140A and/or the second pin 140B and at least a portion of the electrode 125 moving between a first roll present on the first pin 140A and a second roll present on the second pin 140B. Being extended between the first pin 140A and the second pin 140B may result in the electrode 125 being pulled relatively taut or being under an amount of tension. The first pin 140A and/or the second pin 140A may be made of a substantially inert and non-corrosive material, such as stainless steel, glass, plastic, or fiberglass. In some embodiments, the first pin 140A and/or the second pin 140B may be made primarily of polytetrafluoroethylene (PTFE or Teflon).

At least one spring 135 may be present within the chamber 105 and positioned in such a way as to prevent the layer of lithium 110 and the electrode 125 from touching or directly contacting as the layer of lithium 110 depletes. A polymer 115 may be positioned between the layer of lithium 110 and the electrode 125 to prevent the layer of lithium 110 and the electrode 125 from touching or directly contacting. That is, the spring 135 and the polymer 115 may keep the layer of lithium 110 and the electrode 125 from touching (or contacting) directly. The spring 135 and the polymer 115 may also keep the layer of lithium 110 and the electrode 125 from touching as the voltage is applied by the terminal 120. As lithium ions travel from the layer of lithium 110 to the electrode 125, the layer of lithium 110 may decrease in thickness (i.e., deplete). The spring 135 may keep the layer of lithium and the electrode 125 from touching as the layer of lithium 110 depletes by applying a force on the layer of lithium 110. The distance between the electrode 125 and layer of lithium 110 may be extremely small (i.e., in the range of about 0.1 nm to about 1 mm). In some embodiments, the electrode 125 and layer of lithium 110 may be substantially parallel within the chamber 105. In some embodiments, the polymer 115 may be a plastic polymer which remains substantially inert as the voltage is applied. In some embodiments, the polymer 115 may be at least one of polyethylene, polypropylene, or polystyrene. In some embodiments, the spring 135 may be made of a substantially non-corrosive material, such as stainless steel, a copper-based alloy, or a nickel-based alloy. For the example roll-to-roll device 100 used in experiments, eight springs 135 were used, each made of 316 stainless steel, and 14 inch tall.

In some embodiments, the layer of lithium 110 may be lithium foil, which may be a substantially solid and thin piece of lithium. The layer of lithium 110 may have an initial thickness in the range of about 2 mm to about 20 nm. In some embodiments, the layer of lithium 110 may be made of more than one sheet of lithium foil arranged substantially in parallel.

In some embodiments, the terminal 120 may be a source of direct or alternating current. A terminal 120 may include both a positive connection and a negative connection to form a complete circuit with the roll-to-roll device 100. The terminal 120 may be substantially metal and may provide current from a source of electricity, such as an electrical outlet or a battery. The voltage supplied by the terminal may be in the range of about 0.5 V to about 10 V. In some embodiments, the voltage may be between about 3 V and about 4 V. The voltage may be applied as a relatively constant voltage, a scanning voltage, a multi-step voltage, and/or a pulsing voltage. The voltage may be applied using alternating or direct current. The current may be in the range of about 0.1 ampere (A) to about 10 A. In some embodiments, the current may be approximately 1 A.

In some embodiments, the roll-to-roll device 100 may include at least one wheel (145A or 145B) configured to guide the electrode 125 through the chamber 105. A first wheel 145A may be positioned near the first pin 140A or the second pin 140B and a second wheel 145B may be located within the chamber 105. The first wheel 145A and/or the second wheel 145B may be configured to rotate to assist the electrode 125 in moving through the chamber 105 from the roll of the first pin 140A to the roll of the second pin 140B. The electrode 125 may physically contact the first wheel 145A and/or the second wheel 145B, such that their rotation moves the electrode 125 through the chamber 105. In some embodiments, the terminal 120 may be connected to the second wheel 145B and provide a current and/or voltage to the layer of lithium 110 through the second wheel 145B. In some embodiments, the first wheel 145A and/or the second wheel 145B may be made of a substantially inert and/or noncorrosive material. In some embodiments, the first wheel 145A and/or the second wheel 145B may be made of a substantially conductive material. The substantially conductive material may be coated in a substantially inert and/or noncorrosive material, such as polytetrafluoroethylene (PTFE or Teflon).

In some embodiments, the first pin 140A and/or the second pin 140B may be rotated using a belt 155 and a motor 160. The belt 155 and/or motor 160 may be external to the container 150. The motor 160 may cause the belt 155 to turn the first pin 140A and/or the second pin 140B to roll (or wind) and/or unroll (or unwind) the electrode 125, causing the electrode 125 to "pass" through the chamber 105 as it is rolled and/or unrolled between the first pin 140A and/or the second pin 140B. The motor 160 may be powered by an external source.

FIG. 1B illustrates a cut-away side view of the roll-to-roll device 100. An electrolyte solution 130 may be in the chamber 105, substantially submerging the layer of lithium 110 and/or the electrode 125. In some embodiments, the electrolyte solution 130 may include lithium-based salts (or lithium salts) such as lithium chloride (LiCl), lithium carbonate ($Li_2CO_3$), lithium fluoride (LiF), lithium hexafluorophosphate ($LiPF_6$), lithium bis(trifluoromethanesulfonyl) imide ($LiC_2F_6NO_4S_2$), and/or lithium chlorate ($LiClO_4$). In some embodiments, the electrolyte solution 130 may include lithium salts mixed in aqueous or organic-based solvents and the solvent may catalyze the breakdown of the salt. In some embodiments, the electrolyte solution 130 may contain a suitable lithium-based salt to provide sufficient ion conductivity for moving the active ion form the layer of lithium 110 to the electrode 125. The electrode 125 may then be washed and dried then wound back up.

In some embodiments, the chamber 105 may be positioned within a larger container 150. In some embodiments, the chamber 105 may make up the entirety of the container 150, while in other embodiments the container 150 may have multiple chambers 105 or sections. The container 150 may be made of a solid material that is substantially inert and/or non-corrosive, such as plastic, fiberglass, glass, or stainless steel (such as 316 SS). In some embodiments, the container 150 may be made primarily of polytetrafluoroethylene (PTFE or Teflon). For the roll-to-roll device 100 shown in FIGS. 1A-B, for experimental work the device 100 was approximately 3.5 inches tall, approximately 4 inches wide, and approximately 26 inches long. The chamber 105 in the experimental work was approximately 10.1 inches long. In the experimental work, the length of the electrode in the chamber 105 ranged from about 5.5 cm to about 6.5 cm.

In some embodiments, the first pin 140A and/or the second pin 140B may rotate using adjustable speed control, which may control the speed at which the electrode 125 passes through the chamber 105 (or the speed at which the electrode 125 moves from the first roll to the second roll). For example, the electrode 125 may move through the chamber 105 at a feed rate in the range of 0.01 cm/sec to 5 cm/sec. In some embodiments, the electrode 125 may have a feed rate of approximately 0.05 cm/sec. In some embodiments, the electrode 125 have an unwound length in the range of about 1 cm to about 1000 cm. In some embodiments, the electrode 125 may have an unwound length in the range of about 70 cm to about 100 cm. In some embodiments, the electrode 125 may have a width in the range of about 0.1 cm to about 100 cm. In some embodiments, the electrode 125 may have a width in the range of about 5.5 cm to about 6.5 cm.

Figure 2:
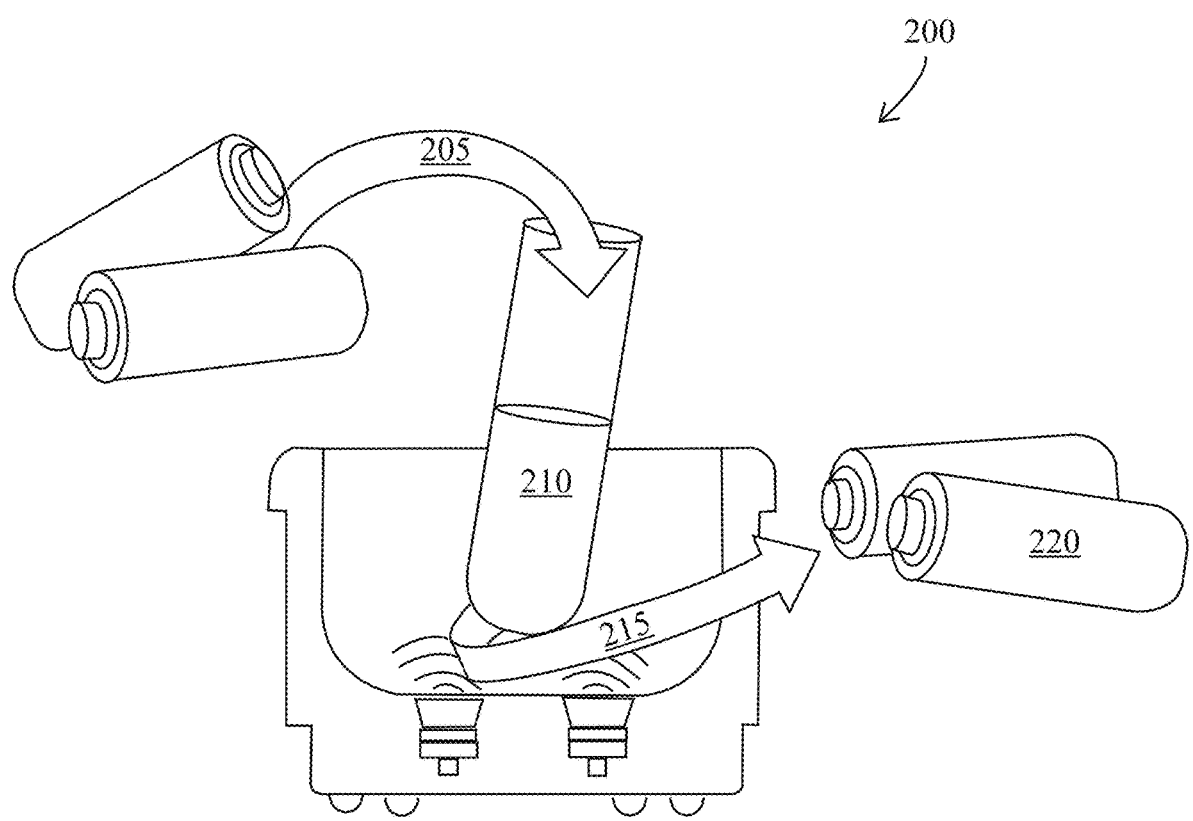
FIG. 2 illustrates a method for repurposing a lithium-ion battery, according to some aspects of the present disclosure.

FIG. 2 illustrates a method 200 of re-purposing a LIB, according to some aspects of the present disclosure. In some embodiments, the method 200 may provide for electrode 125 recycling, where recovered cathodes may be deficient of lithium (i.e., the active ion) after cycling. In other embodiments, the enabling battery electrode materials may be initially devoid of a lithium. For example, many high-capacity cathodes (such as sulfide or iron sulfide) cannot be cycled with a traditional graphite anode because neither contains lithium ions for cycling. When such high-capacity cathodes are repurposed as described by some embodiments of the method 200, the cathode may receive the lithium ions prior to cell assembly. The method 200 may include removing 205 at least a portion of the electrode 125 from a LIB, treating 210 the electrode 125, recasting 215 the portion of the electrode 125 on the LIB, and relithiating 220 the electrode 125. In some embodiments, the method 200 may be performed in that order.

The first step of the method 200 may be removing 205 at least a portion of the electrode 125 from a LIB. In some embodiments, the electrode may be a cathode. The portion of the electrode may be removed 205 by scraping, cutting, pulling, grating, or detaching the mass from a layer of foil on the LIB.

The next step of the method 200 may be treating 210 the portion of the electrode 125. The treating 210 may include at least one of sociating, soaking, or stirring the portion of the electrode 125 in a solvent. As described herein, the solvent may be a solution selected to improve the relithiation capacity of the electrode 125. In some embodiments, the solvent may be a ketone, such as acetone, benzophenone, or acetophenone. In some embodiments, the solvent may contain acetone.

The next step of the method 200 may be recasting 215 the portion of the electrode 125 on the LIB. The recasting 215 may be to place or attach the electrode 125 on a layer of foil of the LIB. The recasting 215 may include allowing the electrode 125 to dry to the layer of foil of the LIB.

The next step of the method 200 may be relithiating 220 the electrode 125. The relithiating 220 may be done using the roll-to-roll device 100 shown in FIGS. 1A-B. The relithiating 220 may include placing or extending at least a portion of an electrode 125 of a LIB substantially in parallel with a layer of lithium 110 in a chamber 105 and applying a voltage to the chamber 105. Applying the voltage may be performed as applying a relatively constant voltage, applying a scanning voltage, applying a multi-step voltage, and/or applying a pulsing voltage. An electrolyte solution 130 may be present within the chamber 105. The electrolyte solution 130 may include a lithium salt. The relithiating 220 may include preventing the electrode 125 and the layer of lithium 110 from touching and/or keeping the electrode 125 and the layer of lithium 110 at a distance that is relatively constant. This preventing may be done using a spring 135 to apply a pressure to the layer of lithium 110 via a plate 165. The plate 165 and/or the spring 135 may apply a pressure to layer of lithium 110 and/or the electrode 125 to prevent them from touching and/or keep them at a distance that is relatively constant as the layer of lithium 110 depletes during the relithiation 220. In some embodiments, the plate 165 may be a substantially planar structure and may be oriented substantially parallel to the layer of lithium 110 and/or the electrode 125. The plate 165 may be made of a substantially inert and/or noncorrosive material, such as stainless steel, glass, fiberglass, or plastic. In some embodiments, the plate 165 may be made of or coated with polytetrafluoroethylene (PTFE or Teflon).

In some embodiments, a rinse in electrolytic solvents may be performed after relithiating 220 to remove residual crystallized lithium hexafluorophosphate ($LiPF_6$) or other salts, which may reduce electrode 125 corrosion due to the reaction of $LiPF_6$ with atmospheric oxygen ($O_2$) and water ($H_2O$). Electrode 125 rinsing after relithiation 220 may include the use of an electrolytic solvent, such as diethyl carbonate (DEC), ethyl carbonate (EC), dimethyl carbonate (DMC), and/or ethyl methyl carbonate (EMC). The choice of electrolytic solvent aims to remove reactive residual $LiPF_6$ without otherwise altering the surface chemistry of the electrode 125.

To be relithiated 220, the electrode 125 must be substantially "rejuvenated" or substantially returned to a condition enabling electrochemical performance approximately equivalent to that of a substantially pristine cathode material. Relithiation 220 may include the re-introduction of lithium into the electrode 125 (often the cathode) lattice to replenish the lithium irreversibly lost to solid-electrolyte interface (SEI) formation and other side reactions. Types of relithiating 220 may include hydrothermal, hydrothermal-ultrasonic, solid-phase sintering, isothermal and electrochemical techniques. These types of re-lithiation 220 all aim to restore both the structure and stoichiometry of substantially unused electrode 125 material, resulting in repurposed electrodes 125 (and thus LIBs) which may perform substantially similarly to unused or "fresh" LIBs (and their electrodes 125).

Figure 3A:
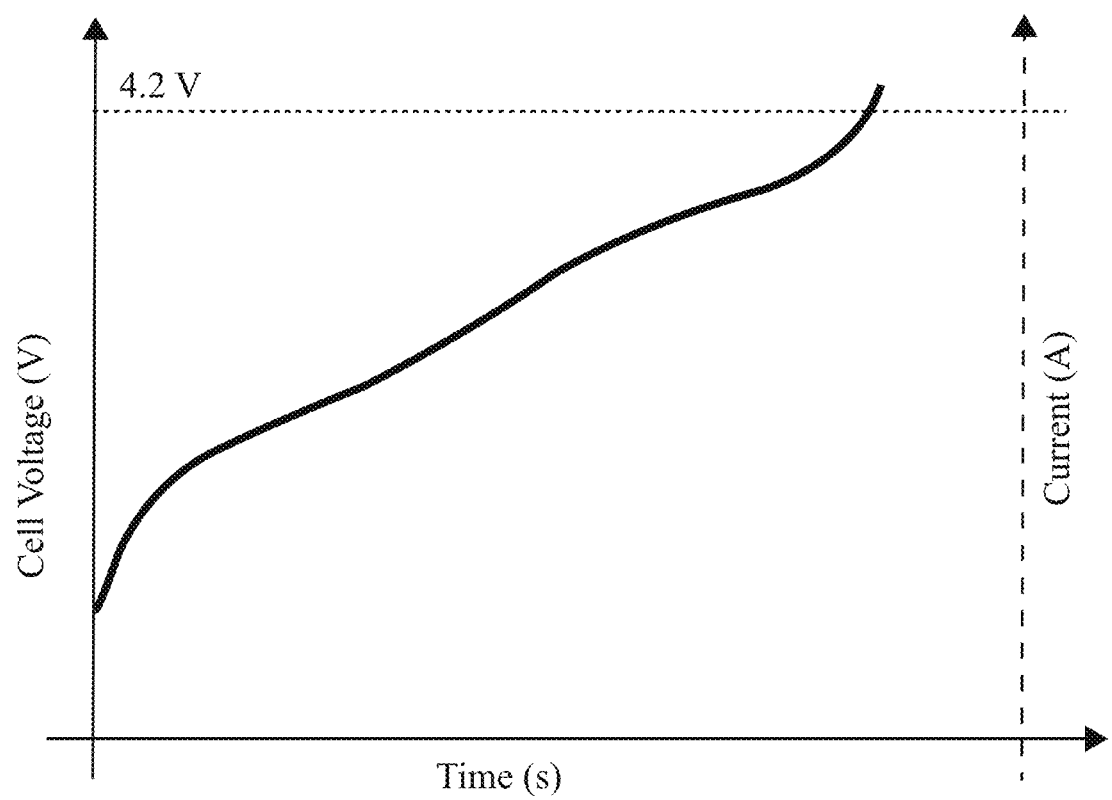
FIGS. 3A-C illustrates exemplary charge protocols for use in the method for repurposing a lithium-ion battery, according to some aspect of the present disclosure.
Figure 3B:
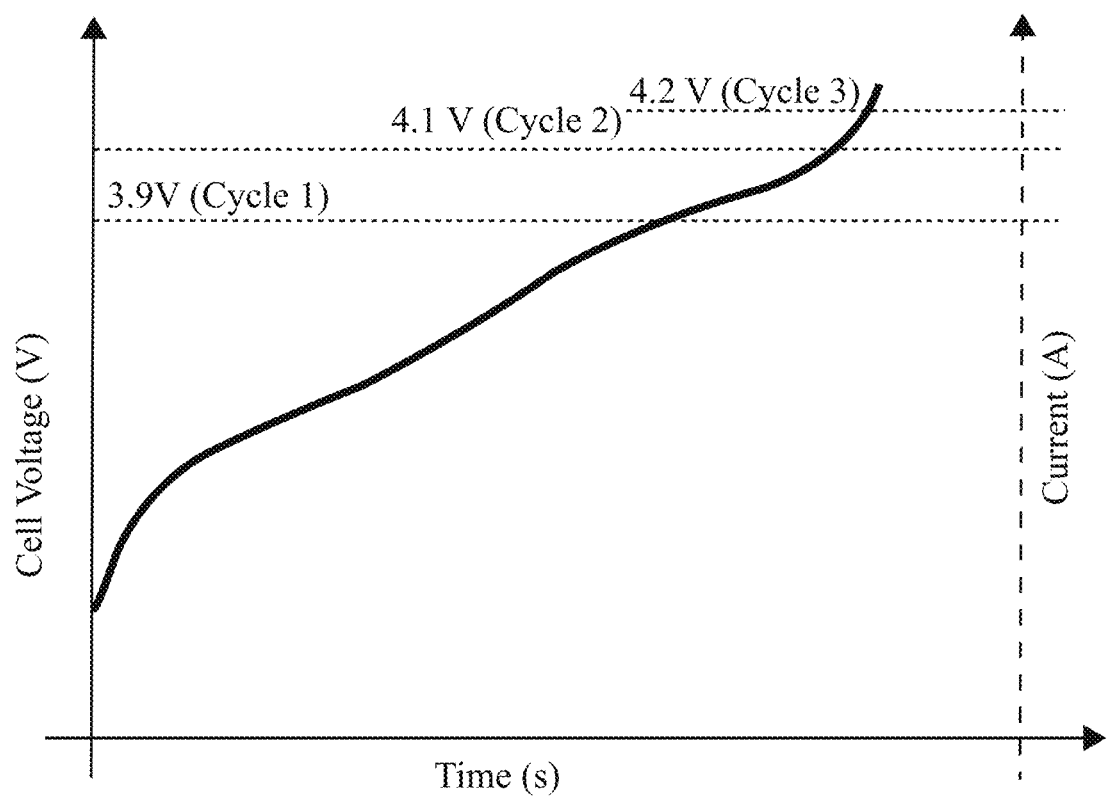
Figure 3C:
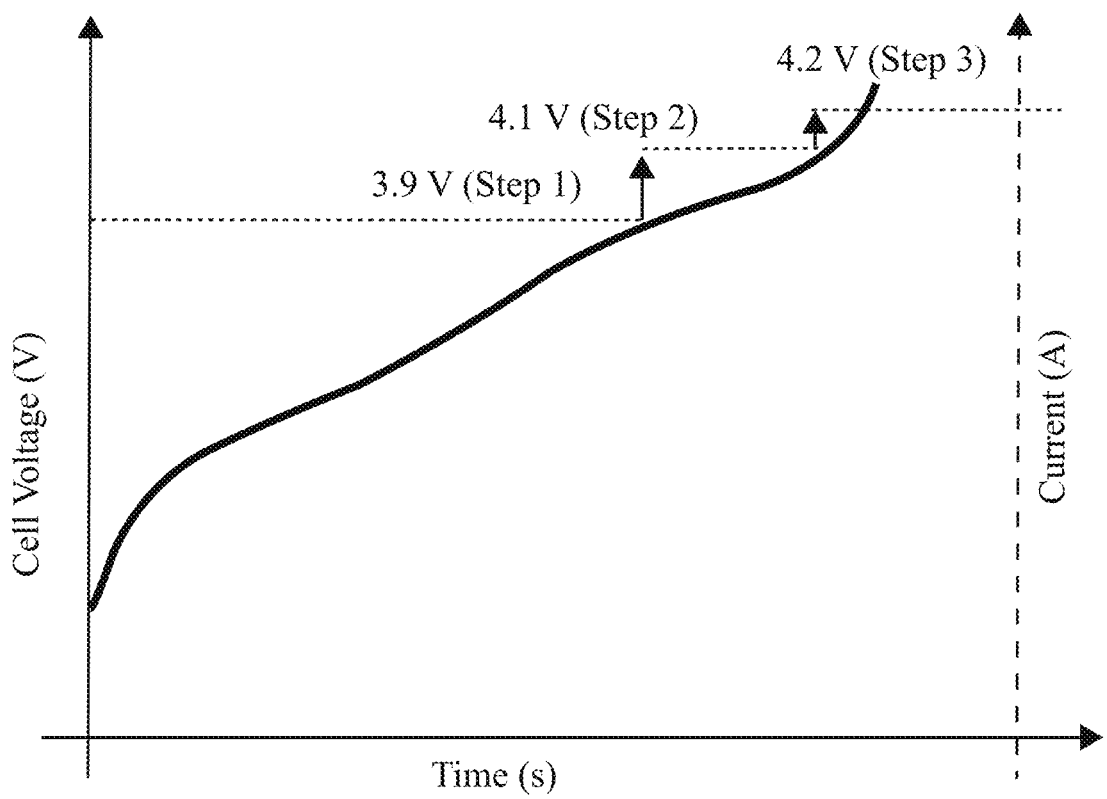

FIGS. 3A-C illustrates exemplary charge protocols for use in the method for repurposing a lithium-ion battery, according to some aspect of the present disclosure; FIG. 3A illustrates a constant current and constant voltage (CC-CV) charge protocol, FIG. 3B illustrates a CC-CV charge protocol with multiple cycles, and FIG. 3C illustrates a multi-step current and multi-step voltage charge protocol, according to some aspects of the present disclosure. The processes shown in FIGS. 3A-C may be performed during the relithiating 220 process of the method 200 as shown in FIG. 2 and may be performed using the roll-to-roll device 100 as shown in FIGS. 1A-B. The voltage and/or current may be supplied using at least one terminal 120 and/or a wheel 145. As described herein, the voltage and/or current may be supplied when at least a portion of the electrode 125 is within the chamber 105.

FIG. 3A illustrates an exemplary CC-CV charge protocol, according to some aspects of the present disclosure. That is, a constant voltage of about 4.2 V was applied to the electrolyte solution 130 while a constant current was also maintained. The electrode 125 may be passed through the chamber 105 a single time or multiple times while this CC-CV is applied. The CC-CV may be applied until the cell voltage (or electrode 125 voltage) reaches about 4.2 V (i.e., the electrode 125 and electrolyte solution 130 reach a substantially steady state).

FIG. 3B illustrates an exemplary CC-CV charge protocol having multiple cycles, wherein the voltage was altered for each cycle, but then held constant through the cycle, according to some aspects of the present disclosure. The first cycle had a constant voltage of about 3.9 V applied, while holding the current constant. For the second cycle, the voltage was held constant at about 4.1 V while holding the current constant. For the third cycle, the voltage was held constant at about 4.2 V while holding the current constant. Each cycle may be operated until the cell voltage (i.e., the electrode 125 voltage) is approximately equivalent to the voltage of the step (i.e., the electrode 125 and the electrolyte solution 130 reach a substantially steady state). A cycle may be a single pass of the electrode 125 through the chamber 105.

FIG. 3C illustrates an exemplary multi-step current and multi-step voltage protocol, according to some aspects of the present disclosure. During the first step, the voltage was approximately 3.9 V at a first current level. For the second step, the voltage was increased to about 4.1 V and the current was also increased to a second current level. For the third step, the voltage was increased again to about 4.2 V and the current was also increased to a third level. Each step was performed until the cell voltage (i.e., the electrode 125 voltage) was approximately equivalent to the voltage of the step (i.e., the electrode 125 and the electrolyte solution 130 reach a substantially steady state). All three steps may be performed during a single pass through of the electrode 125 through the chamber 105. That is, the electrode 125 may remain in the chamber 105 for the duration of the multi-step current and multi-step voltage protocol.

Figure 4:
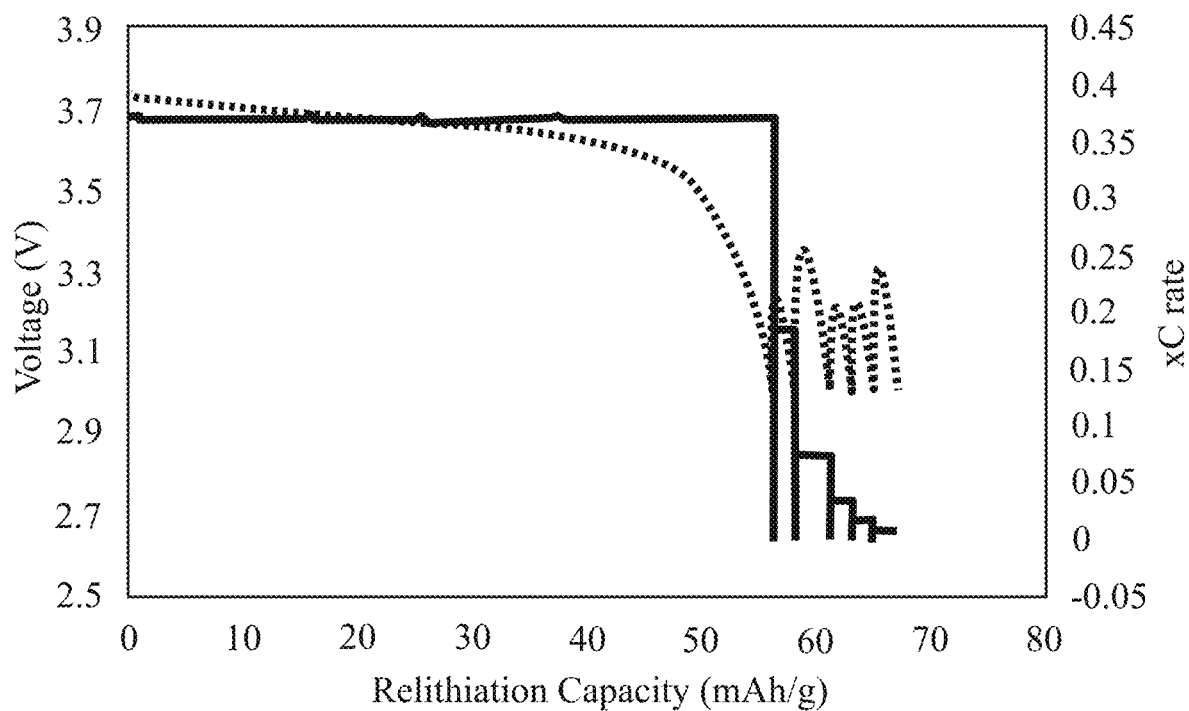
FIG. 4 illustrates an exemplary charge protocol of multi-step current and multi-step voltage for use in the method for repurposing a lithium-ion battery, according to some aspects of the present disclosure.

FIG. 4 illustrates an exemplary charge protocol of multi-step current and multi-step voltage for use in the method for repurposing a lithium-ion battery, according to some aspects of the present disclosure. The solid line represents the current applied to the device 100 and the dotted line represents the voltage of the electrode 125. The current is shown as a relative measure of current (xCr). FIG. 4 shows how the charge protocol increases the relithiation capacity of the electrode 125. The current was held substantially constant until the voltage of the electrode 125 reached a voltage of about 3 V (the capacity of the LIB in the experiment), then the current was decreased, causing a jump in the voltage. This process was repeated until the current level was substantially negligible, and the process was expected to have diminishing returns. The charge protocol shown in FIG. 4 may be performed in a cycle (i.e., each current value applied for a single pass of at least a portion of the electrode 125 through the chamber 105) or in a step (i.e., all currents applied while at least a portion of the electrode 125 remains in the chamber 105).

In most former relithiation studies, the material undergoing remediation treatment has largely been degraded under idealized conditions. In several cases, chemical delithiation has been used to prepare simulated end-of-life cathode electrodes 125; in other cases, cells have been electrochemically cycled under controlled laboratory conditions. Rarely the relithiation of commercial cells that were recovered after "real world" use scenarios are reported. Notably, the electrolyte employed in the preparation of aged electrodes 125 at the laboratory scale typically consists of lithium salt in a standard blend of organic carbonates. While such an approach greatly simplifies the system, it does not accurately reflect the chemistry of commercial LIBs, which regularly contain dozens of additives to enhance performance or address specific electrolyte deficiencies. With a growing focus on the rejuvenation of spent cathode material, there has been relatively little emphasis on addressing the changes to cathode surface chemistry known to occur during a cell's lifetime.

During the operation of an LIB, the electrode 125 surface chemistry may change. For example, for a cathode electrode 125, a resistive surface layer, analogous to the anode's solid electrolyte interface (SEI) may develop. This cathode-electrolyte interface (CEI) may be a source of cathode interfacial resistance and may contribute to cell impedance rise during both the cycling and calendar-aging of high-power LIBs. Functional groups appearing in the CEI may include lithium carbonate ($Li_2CO_3$), hydrocarbons (C—C and C—H moieties), polycarbonate-type compounds, P=O moieties, C=O moieties, C—O—C moieties, $ROCO_2Li$, lithium ethylene dicarbonate (($CH_2OCO_2Li)_2$), lithium peroxide ($Li_2O_2$), and lithium fluoride (LiF). The additives in commercial electrolytes and their associated degradation products compounds this already-complex blend of surface species. For example, the reactivity of an NMC LIB with several electrolyte chemistries and two common additives (fluoroethylene carbonate ($C_3H_3FO_3$) and vinylene carbonate ($C_3H_2O_3$)) may result the formation of a peroxo-like surface layer on the CEI, particularly at higher voltages.

Given the adverse impact of the CEI on cathode performance during the cell's lifetime, the presence of CEI may also inhibit cathode remediation strategies, particularly electrochemical relithiation 220. Thus, as described in this present disclosure, establishing an optimal protocol for the removal of resistive surface species from commercial end-of-life electrodes 125 (via treating 210) is crucial to successful electrode 125 rejuvenation. The removal of electrolyte species from an electrode 125 appears to be polarity-controlled, and the targeted removal of electrolyte species may be achieved via gradient washing (i.e., exposure to a solvent).

However, in the context of pre-processing for electrode 125 (specifically cathode) recycling, such surface alteration is desired, rather than unwanted, and thus, the scope of solvent choice should be expanded beyond typical electrolyte solvents. For example, the importance of solvent polarity on the removal of electrode 125 surface species may be considered. While solvent polarity is undoubtedly a crucial parameter to consider, solvent behavior can more comprehensively and consistently be classified by the correlation between the dielectric parameter β (proportional to the ratio $μ^2/V$ from electrostatic solvation theory, with μ as the dipole moment and V the molar volume) and the empirical solvent polarity parameter ET(30), based on transition energy for the longest-wavelength solvatochromic absorption band of the pyridinium-N-phenoxide betaine dye. Based on these correlations, solvents can be categorized into several classes: Class 1 contains weakly dipolar non-hydrogen bonding donors (including ethers and carboxylic esters), Class 2 contains dipolar non-hydrogen-bonding donors (including ketones), and Class 3 contains hydrogen-bonding donors (including alcohols). Further, the chemical structure and associated reactivity of the solvent should be considered. The primary modes of molecular interaction with cathode surface have been outlined, including physisorption; chemisorption; dissociation; ion transfer; and charge transfer. Residual electrolyte solvents and intact $LiPF_6$ are weakly physiosorbed on the cathode surface, and thus may easily be removed via rinsing with electrolyte solvent. However, end-of-life degradation species—particularly the complex products derived from the reaction of electrolyte and additives—are anticipated to experience multiple modes molecular interaction with the cathode surface, and thus may require mor reactive solvents.

To this end, in the present disclosure, solvents were selected across both polarity classes and anticipated reactivities, based on chemical structure. In particular, diethyl carbonate ($C_5H_{10}O_3$)—a common solvent used for electrode 125 rinsing—was selected to represent Class 1 compounds; acetone—a cheap and readily available solvent—is a highly reactive Class 2 solvent with moderate β and ET(30) values; propylene carbonate—an electrolyte solvent—is a Class 2 solvent with high β and ET(30) values; and isopropyl alcohol—another inexpensive and common solvent—represents Class 3 compounds. These four solvents are intended to direct the future optimization of solvent parameters for electrode 125 washing applications.

The present disclosure employs four common solvents representing a range of polarity and chemical reactivity: Acetone ($C_3H_6O$), $C_5H_{10}O_3$, isopropyl alcohol ($C_3H_8O$), and propylene carbonate ($C_4H_6O_3$). Effects may be characterized using electrochemical analysis (capacity, dQ/dV, EIS), structural analysis (XRD), and chemical analysis (GC-MS). Further, the present disclosure utilizes electrode 125 washing in conjunction with electrochemical relithiation 220 to increase electrode 125 capacity recovery. The combination of solvent washing (i.e., treating 210) and electrochemical relithiation 220 was found to enable capacity improvements of up to 174% relative to unwashed relithiated electrodes 125.

The electrodes 125 used in the following experiments was obtained from commercial 40 Ah pouch LIBs containing 34 pairs of electrodes 125 and 68 layers of separator. Characterization via inductively coupled plasma atomic absorption spectroscopy (ICP-AAS) has suggested an approximate transition metal stoichiometry of $Ni_{0.41}Mn_{0.36}Co_{0.23}$ in the as-received cathode material, with 92% active material (4.5% conductive carbon, 3.5% binder); as-received anodes contained 93% graphite active material (7% binder). However, the method 100 including treating 210 and relithiating 220 may be used with other types of LIBs and electrodes 125. "Fresh" electrodes 125 were stored under inert conditions for approximately one year, and under atmospheric conditions for approximately one year. "Cycle-aged" electrodes 125 were recovered from cells that were first cycled at approximately room temperature (approximately 25° C.) within a voltage window of about 3.0 to about 4.1 V (2C charging rate; 1C discharging rate) for about 5600 cycles, then stored under argon for approximately one year and under atmospheric conditions for approximately one year.

At least a portion of a used electrode 125, specifically a cathode, (also known as a black mass) was removed from "cycle-aged" cathodes using a razor blade. For aged-unwashed electrodes 125, the electrode 125 was directly processed in slurry format (97% used electrode 125, 3% polyvinylidene difluoride (PVDF) binder in N-methyl pyrrolidone (NMP) solvent) and recast onto a fresh aluminum current collector foil (i.e., foil to form a cathode). For aged-washed electrodes 125, about 0.5 g of the used electrode 125 was added to 25 mL of each of four solvents (acetone, diethyl carbonate (DEC), isopropyl alcohol (IPA), and propylene carbonate (PC)). The suspensions were sonicated for about 30 min, followed by centrifugation (at about 1440 rpm at about 22° C., for about 10 min). Supernatants were decanted, and the remaining solvent was dried from the electrode 125 under atmospheric conditions for approximately 10 hours. To achieve further solvent removal, electrodes 125 were then dried at low temperature (approximately 60° C.) for about 24 hours. Aged-washed electrodes 125 were then processed in slurry format (about 97% used electrode 125, about 3% PVDF binder in NMP solvent) and recast onto fresh aluminum current collector foils.

Two-electrode 125 (i.e., full cell) coin LIBs were prepared from fresh, aged-unwashed, and aged-washed cathodes, each paired with fresh anode. Cell assembly was conducted at about room temperature in a glovebox following overnight electrode 125 drying at about 105° C. In all full cells, about 50 μL of Gen 2 electrolyte (1.2 M LiPF$_6$ in EC/EMC of about 3:7 by weight) and Celgard separator were used.

Following about 6 hours of rest at room temperature, full cells were cycled between about 4.2 and about 2.8 V at about 25° C. using a multichannel battery cycler. A constant-current/constant-voltage (CC/CV) protocol was utilized, with a charge/discharge rate of C/20 (approximately 0.15 mA) for two initial formation cycles and a charge/discharge rate of C/10 (approximately 0.3 mA) for about 100 cycles.

Discharge capacity is typically reported on a per-gram basis, with grams of electrochemically active NMC as the basis of normalization. However, the heavily aged electrodes 125 utilized in this analysis were believed to contain significant levels of degradation products. Thus, capacity normalization for washed electrodes 125 is calculated in two ways in this present disclosure: i) specific discharge capacity (mAh/g) is calculated assuming substantially the same proportion of NMC (92%) as in the pristine electrode 125, adjusted by the proportion of the electrode 125 (97%) in the re-cast slurry; ii) normalized discharge capacity is reported as the ratio of the specific discharge capacity for each cell (as calculated in i)) to the average specific discharge capacity of the fresh electrodes 125 at beginning of life (first cycle post-formation).

To simulate an electrochemical relithiation process, half coin cells were prepared from fresh, aged-unwashed, and aged-washed cathodes, each paired with lithium foil. Cell assembly was conducted at room temperature in a glovebox following overnight cathode drying at about 105° C. In all half cells, about 50 μL of Gen 2 electrolyte (1.2 M LiPF$_6$ in EC/EMC of about 3:7 by weight) and Celgard separator were used.

Half cells were rested for about 6 hours at room temperature and were then cycled at about 25° C. using a multichannel battery cycler. Four cycles were conducted at a constant C/10 current (of about 3 mA) between about 4.3 and about 3.0 V, with about a two-minute rest period after each charge and discharge.

Following relithiation 220, half cells were disassembled in a glovebox, and the cathode was nondestructively recovered. Relithiated full cells (i.e., LIBs) were then constructed using the relithiated cathodes and fresh anode, as described above. CC/CV cycling at C/10 was conducted as described above, with cycling paused after about every 20 cycles for intermediary electrochemical analysis. Discharge capacity is reported as described above.

EIS was conducted on relithiated LIBs after about every 20 cycles. Prior to EIS analysis, all LIBs were charged at C/20 to about 4.0 V and were held at approximately 4.0 V for about 6 hours. LIBs were then rested for a minimum of two hours to ensure that steady-state potential was achieved. Electrochemical impedance data was collected using a VersaSTAT 4 Potentiostat/Galvanostat (Princeton Applied Research) from about 0.1 MHz to about 1 mHz, with data recorded at 10 points per decade using an AC magnitude of 1 MV. Impedance was normalized by cathode active mass.

EIS data was analyzed by complex non-linear least squares (CNLLS) fitting of an equivalent circuit model. Before fitting EIS data, a linear Kramers-Kronig (lin-KK) test was performed to ensure each EIS measurement was sound. The lin-KK test was performed using the open source analysis tool impedance.py. No systematic measurement error across the data set was detected. Data points at frequencies lower than the low-frequency turning point, identified as the first minima in imaginary component of cell impedance when searching from low-to-high frequencies, were removed before fitting. Remaining data was then fit with an equivalent circuit model (ECM). To fit pseudo-semicircular features of the EIS data, three sets of parallel resistor-constant phase elements (ZARC elements) were used in series with a single resistor; this model has been shown to be accurate through both traditional impedance analysis and machine learning approaches. Fits conducted with two ZARC elements displayed systematic errors at high frequencies, and Nyquist and Bode phase plots of experimental data clearly displayed contributions from three distinct processes.

The ECM was fit to each data series using CNLLS via the SciPy function curve-fit, as implemented by impedance.py. The shape factor of CPE elements was constrained between 0.8 and 1, ensuring each ZARC element displayed relatively semi-circular impedance.

Diffraction patterns of cast electrodes 125 (comprised of fresh, aged-unwashed, or aged-solvent-washed cathode) were obtained using a Rigaku Ultima IV diffractometer with CuKα radiation (about 40 kV and about 40 mA) with a scintillation counter detector and 5 mm divergence slit. High-resolution scans were conducted from about 100 to about 90° 2θ (approximately 0.04° step size with about 10 sec dwell time). Reitveld refinement was conducted using Profex software. Refinement details are discussed further in the text.

To obtain a highly concentrated analyte suitable for chemical analysis, wash solutions were prepared using approximately 0.5 g of the electrode 125 in about 5 mL of each of the four solvents analyzed (acetone, DEC, IPA, PC). The suspensions were sonicated for about 30 min, followed by centrifugation (at about 1440 rpm at about 22° C., for about 10 min). Supernatants were decanted and retained for analysis.

Direct-immersion solid phase microextraction (SPME) sampling was employed to further concentrate the analyte. A polyacrylate (PA) SPME fiber (approximately 85 m coating thickness) was exposed to about 4 mL of each wash supernatant for about 15 min under magnetic stirring (about 100 rpm). The PA fiber was desorbed in the injection port at approximately 270° C. for about 1.5 min. The fiber was rinsed with methanol (for about 2 min at about 100 rpm) and conditioned for about 5 min (at approximately 260° C.) between electrodes 125 to attempt to avoid sample carryover.

Analysis was conducted using an Agilent 7890B Gas Chromatograph (GC) coupled with an Agilent 5977B Mass Spectrometer (MS). A column optimized for the separation of electrolyte components (Wasson-ECE Instrumentation) was utilized. The system was run with helium as carrier gas at a column flow of about 1 mL/min in splitless mode, and the following column oven program, a starting temperature of about 40° C. was held for about 2 min; the temperature was increased at a rate of about 3° C./min to about 60° C., and then at about 30° C./min to about 260° C.; the final temperature of about 260° C. was held for about 2 min. MS was conducted using electron ionization (EI) with an ion source temperature of about 230° C. and a detector voltage of about 1.02 kV in the range m/z between about 10 and about 300.

Spectra were analyzed using Enhanced ChemStation software (Agilent) and compounds were identified through MS spectral matching using the NIST MS Search Program v.2.3.

Figure 5A:
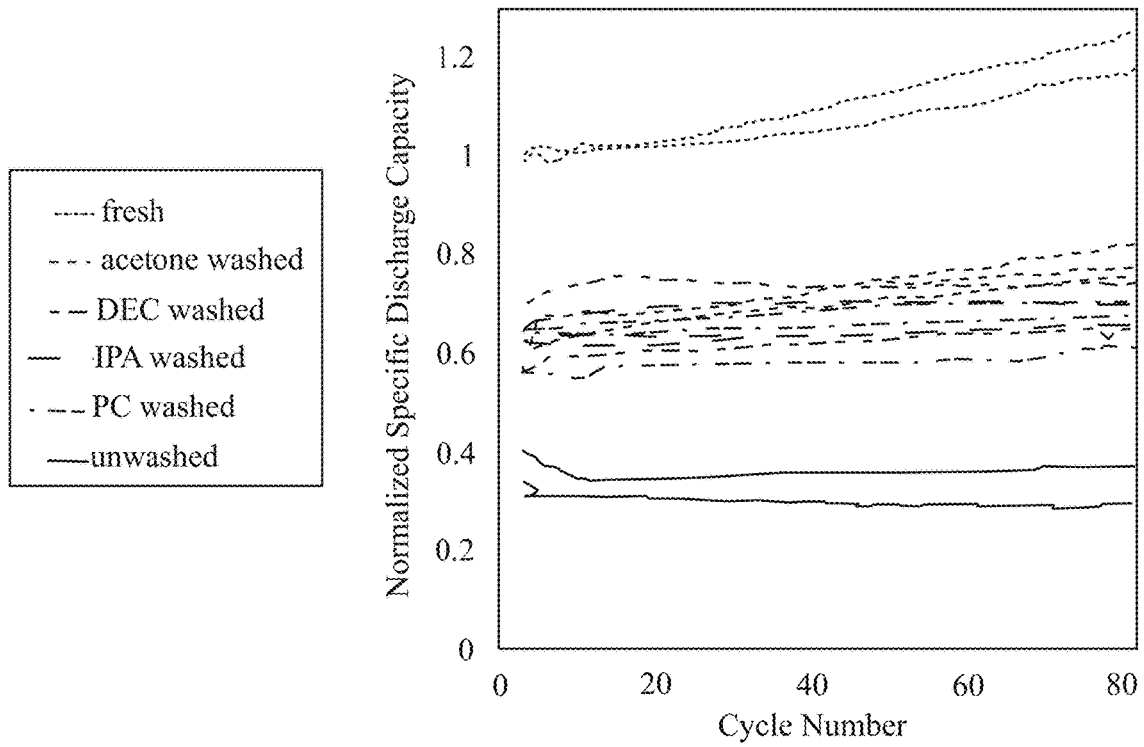
FIGS. 5A-B illustrate the electrochemical cycling performance of fresh and cycle-aged cathode materials, with and without washing in various solvents.
Figure 5B:
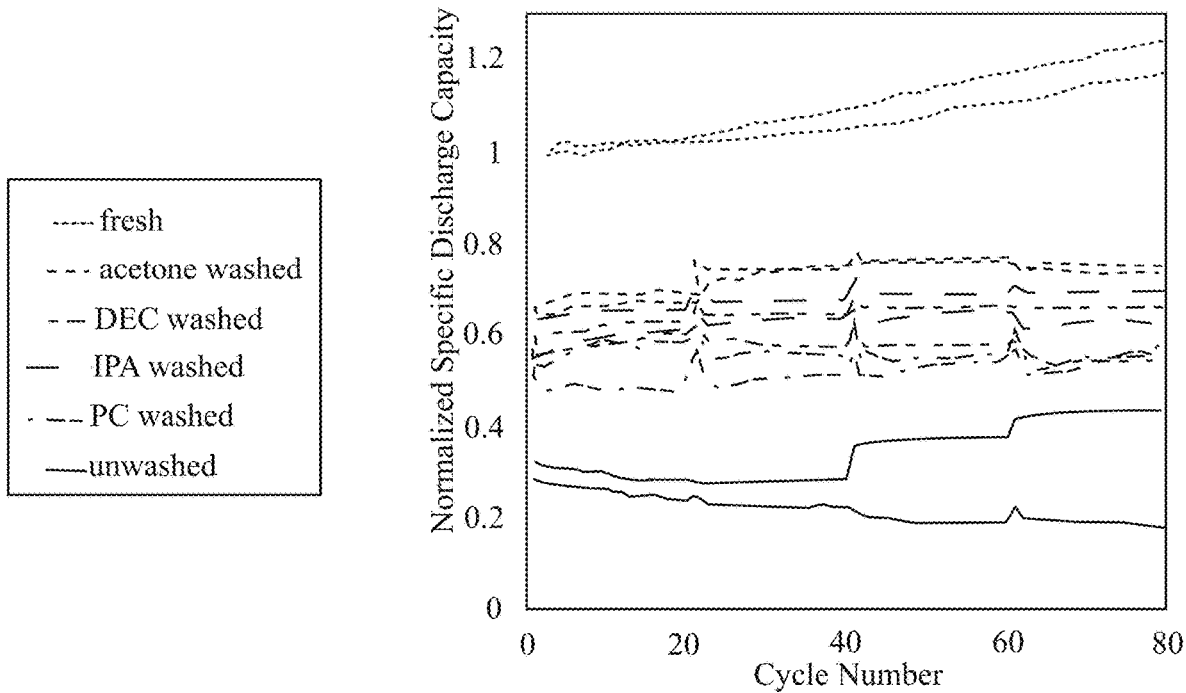

Electrochemical full-cell cycling data for fresh, aged-unwashed, and aged-solvent-washed cathodes is shown in FIGS. 5A-B, and selected capacity values and statistics are tabulated in Table 1. As demonstrated in FIG. 5A and Table 1, washing alone (without subsequent relithiation) is found to significantly increase discharge capacity. All washed (i.e., treated 210) electrodes 125 showed an 88% or greater capacity improvement (mAh/g) over unwashed electrodes 125 under full-cell CC/CV cycling by cycle 10. Interestingly, capacity is found to continuously increase for acetone-washed electrodes 125 over 100 cycles, with these electrodes 125 showing a 134% improvement over unwashed electrodes 125 at cycle 80. This trend is also observed for fresh electrodes 125 but does not appear to occur significantly for unwashed electrodes 125 or electrodes 125 subject to the other three washing conditions. By cycle 80, the performance of aged electrodes 125 (i.e., cathode material) is generally found to increase as unwashed (U) is significantly less than PC-washed (PC-W), which is less than IPA-washed (IPA-W), which is less than DEC-washed (DEC-W), which is less than acetone-washed (Ac-W).

FIG. 5B and Table 1 show the effect of washing followed by electrochemical relithiation 220 on full-cell discharge capacity. Cells were removed after each 20 cycles and charged to 4.0 V at a slower rate (C/20 followed by a trickle-charge voltage hold) for EIS analysis, resulting in a single-cycle elevated capacity value after formation and each subsequent 20 cycles. For all relithiated cells, capacity values were found to be slightly reduced on an absolute basis (mAh/g) as compared to their equivalent counterparts tested without relithiation 220. This is likely the result of the fabrication method, which involved cell disassembly from the half-cell (i.e., through relithiation 220) condition and re-assembly into a full cell. Electrode 125 mass used for normalization was calculated prior to half-cell assembly, and thus did not reflect any potential mass loss due to inadvertent mechanical damage during disassembly. However, the electrochemical performance of all relithiated cells is directly comparable, as methods were maintained consistently between electrodes 125.

FIGS. 5A-B illustrate electrochemical cycling performance of fresh and cycle-aged electrode 125 (i.e., cathode) material, with and without washing in various solvents: FIG. 5A Washing condition only; FIG. 5B Washing followed by electrochemical relithiation 220. In both cases, cycling data is shown for full cells (vs graphite anode) at C/10 CC/CV and two initial formation cycles (C/20 CC/CV) are omitted. Capacity is reported as a normalization by the average 3rd (1st post-formation) cycle specific discharge capacity (mAh/g) of the fresh electrode 125 replicates.

Table 1 shows full-cell discharge capacity of cathodes under washing condition only (top) and washing followed by subsequent relithiation 220. Data is reported for cycles 10, 50, and 80 following formation. Capacity recovery for each washed electrode 125 is reported on a mAh/g-discharge basis as compared to the unwashed electrode 125 in that washing condition. All reported values reflect an average of cell replicates.

TABLE 1

Full-cell discharge capacity of cathodes (a type of electrode 125) under washing condition and washing followed by subsequent relithiation 220.

| | | Cycle 10 | | Cycle 50 | | Cycle 80 | |
|---|---|---|---|---|---|---|---|
| | Sample | Discharge Capacity (mAh/g) | % Recovery (vs unwashed) | Discharge Capacity (mAh/g) | % Recovery (vs unwashed) | Discharge Capacity (mAh/g) | % Recovery (vs unwashed) |
| Washing Condition Only | U | 33.61 | — | 33.46 | — | 34.16 | — |
| | Ac-W | 68.32 | 103% | 75.05 | 124% | 79.85 | 134% |
| | DEC-W | 68.55 | 104% | 69.85 | 109% | 71.23 | 109% |
| | IPA-W | 66.09 | 97% | 67.68 | 102% | 68.70 | 101% |
| | PC-W | 63.25 | 88% | 65.95 | 97% | 67.71 | 98% |
| Washing Plus Relithiation | U-W-R | 28.48 | — | 28.41 | — | | |
| | Ac-W-R | 69.29 | 143% | 77.71 | 174% | | |
| | DEC-W-R | 61.59 | 116% | 63.09 | 122% | | |
| | IPA-W-R | 63.30 | 122% | 68.22 | 140% | | |
| | PC-W-R | 54.07 | 90% | 54.91 | 93% | | |

As shown in FIGS. 5A-B and Table 1, by cycle 10, acetone-washed-relithiated (Ac-W-R) electrodes 125 show a 143% capacity improvement over unwashed-relithiated (U-R) electrodes 125. Discharge capacity of Ac-W-R electrodes 125 is again found to increase with full-cell cycling up to approximately 60 cycles, with capacity reaching 174% of U-R electrodes 125 by cycle 50. Capacity declines slightly on the subsequent cycles, with Ac-W-R electrode 125 capacity around 139% of U-R electrodes 125 by cycle 80. Ac-W-R electrodes 125 also show the tightest reproducibility of all relithiated electrodes 125. Similar to the initial (non-relithiated) condition, performance is generally found to increase as U-R was significantly less than PC-washed-relithiated (PC-R), which was less than IPA-washed-relithiated (IPA-W-R), which was approximately equivalent to DEC-washed-relithiated (DEC-W-R), which was less than Ac-W-R.

Even for the best-performing Ac-W-R electrode 125, electrochemical capacity is still greatly reduced (about 35%) relative to an fresh electrode 125. However, the contribution of solvent washing to both direct capacity recovery and the facilitation of subsequent electrochemical relithiation 220 is remarkable. Additionally, the commercial cathode material (i.e., electrode 125) used herein was very heavily degraded, showing about 70% capacity loss compared to the fresh electrode 125 and demonstrating visible surface damage (pitting, deposits). This electrode 125 represents a true worst-case for recycling, as electric vehicle batteries are typically considered to reach their end of life at 20-30% capacity loss (70-80% state-of-health). Capacity recovery is anticipated to be significantly improved in less-degraded electrodes 125.

Figure 6:
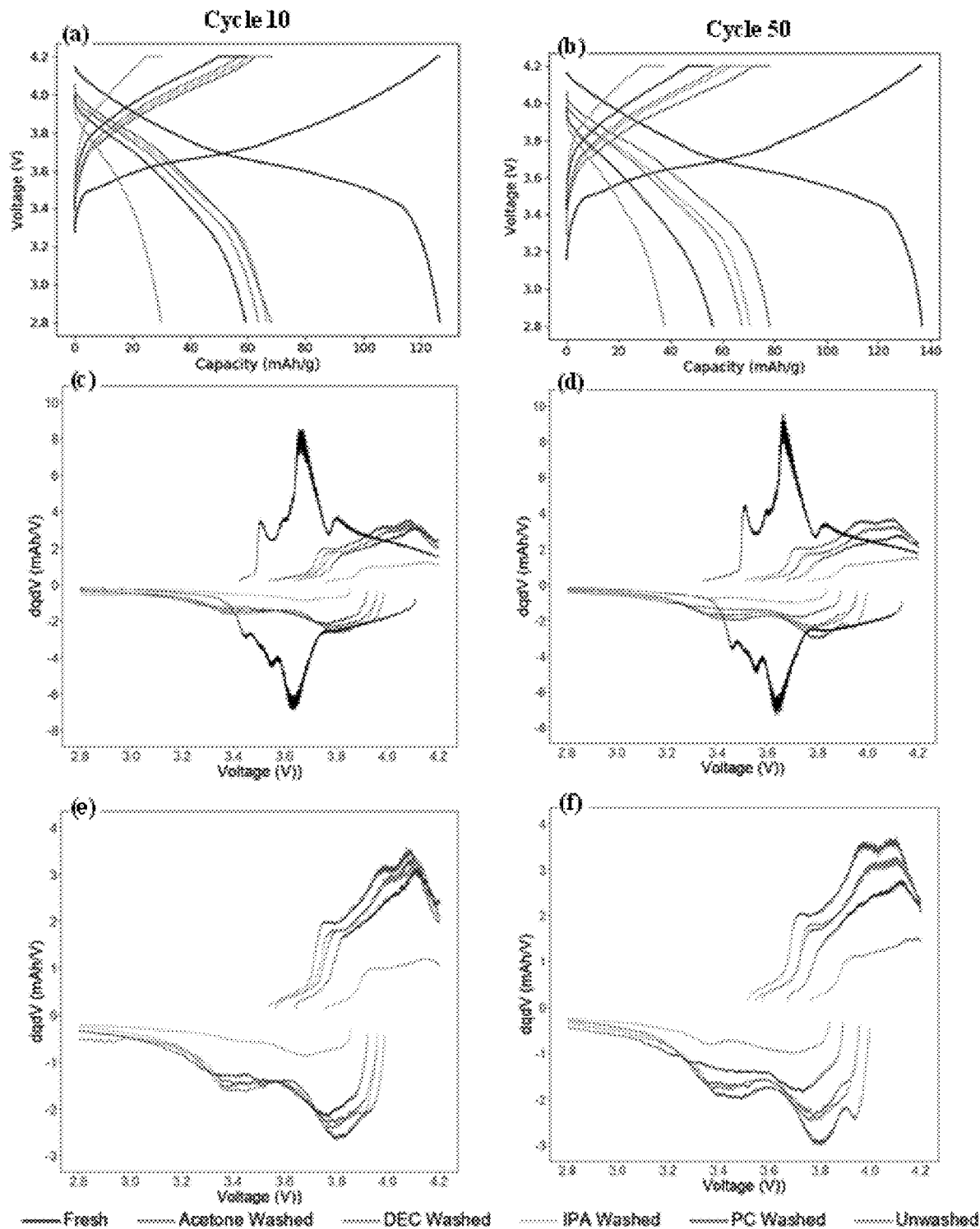
FIG. 6 shows discharge profiles panels (a) and (b) and corresponding differential capacity (dQ/dV) plots in panels (c-f) for fresh and cycle-aged cathode material, with and without washing in various solvents, after 10 panels (a, c, e) and 50 panels (b, d, f) cycles following electrochemical relithiation, according to some aspects of the present disclosure.

The electrochemistry of the relithiated electrodes 125, with and without solvent washing, is further explored in FIG. 6. Voltage profiles corresponding to cycles 10 and 50 following relithiation 220 are shown in panels (a) and (b); a voltage profile for the fresh electrodes 125 is included for comparison. For consistency, the best performing (i.e., highest discharge capacity) replicate for each condition is shown. At both cycle 10 and cycle 50, voltage plateaus are evident for the aged electrode 125, most notably for the Ac-W-R, DEC-W-R, and IPA-W-R electrodes 125. This profile shape indicates the presence of the spinel phase and has previously been reported for this commercial electrode 125. Structural analysis will be taken up in greater detail in the subsequent section. Panels (c)-(f) of FIG. 6 present the corresponding dQ/dV plots for cycles 10 and 50. The fresh electrode 125 shows a dominant redox peak at approximately 3.65 V, with smaller redox peaks at about 3.5 V and about 3.8 V. The dominant peak is attributed to $Co^{3+/4+}$ and $Ni^{2+/3+/4+}$ redox, which occurs at similar potentials and is thus typically indistinguishable in dQ/dV analysis. The peak at approximately 3.8 V is attributed to anionic redox, and the peak at approximately 3.5 V has been attributed to the minor activity of the reversible $Mn^{3+/4+}$ couple and additional anionic redox, which also typically overlap. For the fresh electrode 125, minimal hysteresis is observed between charge and discharge.

FIG. 6 shows discharge profiles in panels (a) and (b) and corresponding differential capacity (dQ/dV) plots in panels (c-f) for fresh and cycle-aged cathode material (i.e., electrode 125), with and without washing in various solvents, after 10 in panels (a, c, e) and 50 in panels (b, d, f) cycles following electrochemical relithiation 220. Panels (e) and (f) of FIG. 6 are insets of panels (c) and (d), respectively, with cycle-aged electrodes 125 shown to highlight distinctions between washing conditions.

Analysis of the aged electrodes 125 suggests a drastic shift in the mechanism of electroactivity, even for the solvent-washed electrodes 125 in which capacity has been recovered. Hysteresis is found to significantly increase relative to the fresh electrodes 125, and voltage fade is observed for both charge and discharge profiles (panels (c) and (d) of FIG. 6). Specifically, as voltage decreases, transition metals that have migrated into the tetrahedral sites of the Li layer may return to their original vacant octahedral site, which has shifted in energy (hysteresis), or may occupy another cubic site (voltage fade). The loss of the dominant transition metal redox peak in the aged electrodes 125, in conjunction with both hysteresis and voltage fade, suggests significant transition metal migration in this material, coupled with a structural rearrangement observed in both electrochemical and XRD measurements.

The reduction in electrochemical activity for the aged electrodes 125 can readily be explained via the above-described mechanism. More interesting, however, is the recovery in electrochemical redox for solvent-washed-relithiated electrodes 125, and the disparity observed between solvent conditions on electrochemical behavior. As shown in in panels (e-f) in FIG. 6, the U-R electrode 125 shows virtually no electrochemical activity, with one minor redox peak at approximately 3.9 V/approximately 3.7 V (charge/discharge). In contrast, each of the washed electrodes 125 shows 2-3 redox peaks for both charge and discharge. It is probable that the central peaks for each of the washed electrodes 125 (approximately 4.0 V/approximately 3.8 V charge/discharge) are attributable to Ni and Co redox, which has been recovered due to the removal of insulating surface species by solvent washing. These peaks show both significant voltage shift and hysteresis as compared to the fresh electrode 125, again attributable to asymmetric transition metal migration. The decrease in intensity of the dominant transition metal redox peak has been previously observed for $LiNi_xCo_yMn_{(1-x-y)}$ (hereafter "NMC") electrodes 125 following extended cycling, and the reduction in Ni/Co contribution to overall redox has been tied to incomplete cationic redox—particularly incomplete Ni oxidation—in cycled electrodes 125.

The growth in the redox peaks above and below the transition metal peak for washed-relithiated electrodes 125 implies a significant increase in bulk anionic redox and suggests that anionic redox may be dominating electrochemical activity in these refurbished cathodes. Anionic redox—the reversible electrochemical activity of bulk lattice oxygen ($O^{2-}/O^{n-}$)—has only recently gained traction as a mechanistic framework for understanding the electrochemistry of NMC electrodes 125. By this mechanism, cobalt and nickel are the main cationic redox couples, with a gradual increase in $Mn^{3+/4+}$ activity also contributing to low-voltage redox after extended cycling. At voltages above and below the cobalt/nickel (overlapping) dQ/dV peak, bulk anionic redox is found to contribute to charge compensation, and thus drive electrochemical activity. It has been reported that reversible redox of bulk lattice oxygen may account for nearly half of observed capacity in NMC electrodes 125 and remains active over extended cycling. While the oxygen redox capacity has previously been found to decrease with cycling through the irreversible loss of lattice oxygen, either as $O_2$ or through the formation of degradation products, the present analysis suggests that this anionic redox may be recoverable, and perhaps even enhanced, through solvent washing.

It has been suggested that solvent washing with polar solvents (alcohol, water) as a post-synthetic step induces surface reconstruction by the removal of certain surface defects, including carbonates and hydroxides. Reaction with the four solvents, particularly under mechanically aggressive washing conditions (i.e., sonication) may similarly reconstruct the surface of the NMC particles. The strong nucleophilicity of acetone and the moderate nucleophilicity of DEC, PC, and IPA implies probable reduction at the NMC surface. It appears acetone adsorbs to weak acid sites on transition metal oxide surfaces and is subsequently oxidized by reactive surface (lattice) oxygen. This process is accelerated by the presence of oxygen vacancies in the lattice, which is anticipated in the end-of-life cathode material (i.e., electrode 125). It is feasible that reduction by acetone—most strongly—or carbonates/alcohols—more weakly—could re-introduce oxygen back into the bulk lattice. This oxygen may be derived from either the solvent itself or adsorbed electrolyte/degradation products. Such a transformation of adsorbed oxygen species at the surface of p-type transition metal oxides to lattice oxygen is thermodynamically favorable and has been proposed to proceed as $O^{2-}$ (adsorbed)→$O^{-}$(adsorbed)→$O^{2-}$(lattice). For the Ac-W-R electrode 125 in particular, the increase in anionic redox between cycles 10-50—observed as the growth of the dQ/dV discharge peak approximately 4.0 V—provides evidence for lattice oxygen re-introduction, and this mechanism may be driving the observed increase in capacity during full-cell cycling.

Electrochemical impedance spectroscopy (EIS) was performed after each 20 cycles for all relithiated full-cell electrode 125 to track impedance growth during cycling. Solvent washing is anticipated to reduce both contact resistance and interfacial charge transfer resistance due to the removal of resistive degradation species, while relithiation 220 is expected to impact the bulk structure of the cathode material (i.e., electrode 125), impacting ionic diffusion through the porous electrode 125 as well as charge storage processes. These processes occur around different characteristic frequencies and are thus separable by deconvolution of the impedance spectra.

Equivalent circuit modeling was used to deconvolute the impedance response within the semi-circular regime of the EIS measurements into three processes, each modeling a distinct range of the frequency spectrum: high ($10^5$ Hz), middle ($10^2$-$10^4$ Hz), and low ($10^0$-$10^1$ Hz). Residual errors from all fits show sinusoidal errors at frequencies from $10^0$-$10^3$ Hz, suggesting the equivalent circuit model may not be fully describing features of the EIS spectra. However, error in this region does not impact the present analysis.

The contribution of the cathode to overall impedance is of interest here. While the separate contributions from the anode and the cathode cannot be rigorously distinguished here, the impedance of each ZARC can be loosely attributed to physical processes using detailed studies of similar cells. The characteristic behaviors of the impedance response from each electrode 125 and overall cell impedance are reported in Table 2. High frequencies (greater than about $10^3$ Hz) are dominated by contact resistances (i.e., resistance to conduction of charged species on surfaces and across interfaces), and lower frequencies are dominated by interfacial charge transfer processes and charged species transport through porous electrodes 125. While both electrodes 125 contribute significant impedance across the entire frequency range, cell impedance is typically reported to be dominated by cathodic contributions. Further, since all cells analyzed use identical anodes, differences between cells may reasonably be attributed to the disparate cathode washing treatments.

Table 2 shows characteristic time constants and the physical processes attributed to each frequency range of the impedance response from graphitic anodes, intercalation cathodes, and full cells of lithium-ion batteries using ethylene-carbonate-based electrolytes near room temperature at high states-of-charge. Processes describing the diffusive/capacity tail at low frequencies have been omitted.

TABLE 2

Characteristic time constraints and the physical processes attributed to each frequency range of the impedance response from graphitic anodes, intercalation cathodes, and full cells.

| | Frequency Range (Hz) | Physical Process |
|---|---|---|
| Graphitic Anodes | $10^4$ | Contact impedance (minor) |
| | $10^3$ | Interfacial charge transfer |
| | $10^1$ | Interfacial charge transfer and ion/electron diffusion through porous electrode |
| Intercalation Cathodes | $10^4$-$10^3$ | Contact impedance |
| | $10^1$-$10^0$ | Interfacial charge transfer and ion/electron diffusion through porous electrode |
| Full Cells | $10^4$ | Contact impedance (anode & cathode; anode-dominated) |

Figure 7:
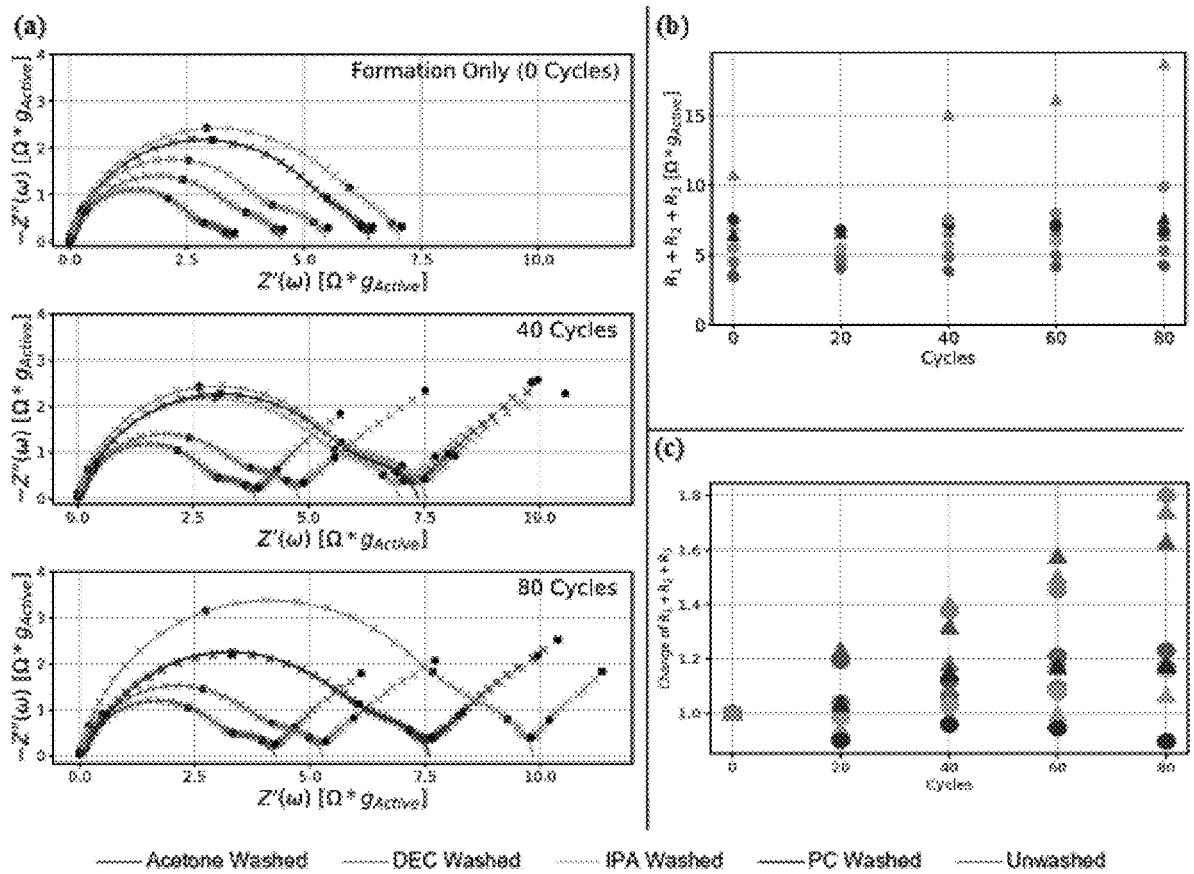
FIG. 7 illustrates panel (a) Nyquist plots for one replicate of each condition (unwashed-relithiated or washed-relithiated) after formation (0 cycles; top); 40 cycles (middle); and 80 cycles (bottom) post-relithiation; panel (b) Sum of deconvoluted resistances ($R_1+R_2+R_3$) for all relithiated cells after each 20 cycles; and panel (c) Change in the sum of the deconvoluted resistances for each cell, calculated via normalization by the initial value of impedance for each cell replicate, according to some aspects of the present disclosure.

EIS spectra for unwashed-relithiated and washed-relithiated electrodes 125 with Ohmic contributions subtracted are shown after formation, 40 cycles, and 80 cycles (panel a of FIG. 7). Consistent with discharge capacity performance, the impedance response from Ac-W-R and DEC-W-R electrodes 125 is substantially lower than that of the IPA-W-R, PC-W-R, and U-R electrodes 125. IPA-W-R electrodes 125 show slightly lower impedance than PCW-R electrodes 125. Notably, the use of any solvent treatment 210 before relithiation 220 appears to stabilize the cathode material (i.e., electrode 125), both in terms of overall polarization impedance panel (b) of FIG. 7 and impedance stability with subsequent cycling panel (c) of FIG. 7. This highlights the importance of solvent washing as a remediation procedure during direct recycling of end-of-life cathode materials (i.e., electrodes 125). Of the washed and relithiated electrodes 125, Ac-W-R and PC-W-R electrodes 125 show the most variability between replicates. Additionally, one Ac-W-R cell experienced substantial impedance growth during cycling, unique among all washed-relithiated cells. However, the impedance of this cell was still lower than that of the IPA-W-R and PC-W-R cells after 80 cycles.

FIG. 7 shows: panel (a) Nyquist plots for one replicate of each condition (unwashed-relithiated or washed-relithiated) after formation (0 cycles; top); 40 cycles (middle); and 80 cycles (bottom) post-relithiation. Ohmic contributions are subtracted to aid comparison of the polarization impedance between cells. 'X' indicates experimental data; solid line indicates ECM fit; black markers denote each frequency decade, starting at $10^5$ Hz; panel (b) Sum of deconvoluted resistances ($R_1$+$R_2$+$R_3$) for all relithiated cells after each 20 cycles; panel (c) Change in the sum of the deconvoluted resistances for each cell, calculated via normalization by the initial value of impedance for each cell replicate. For panels (b) and (c), sample replicates for each washing condition are indicated using circular and triangular markers of the indicated color.

Figure 8:
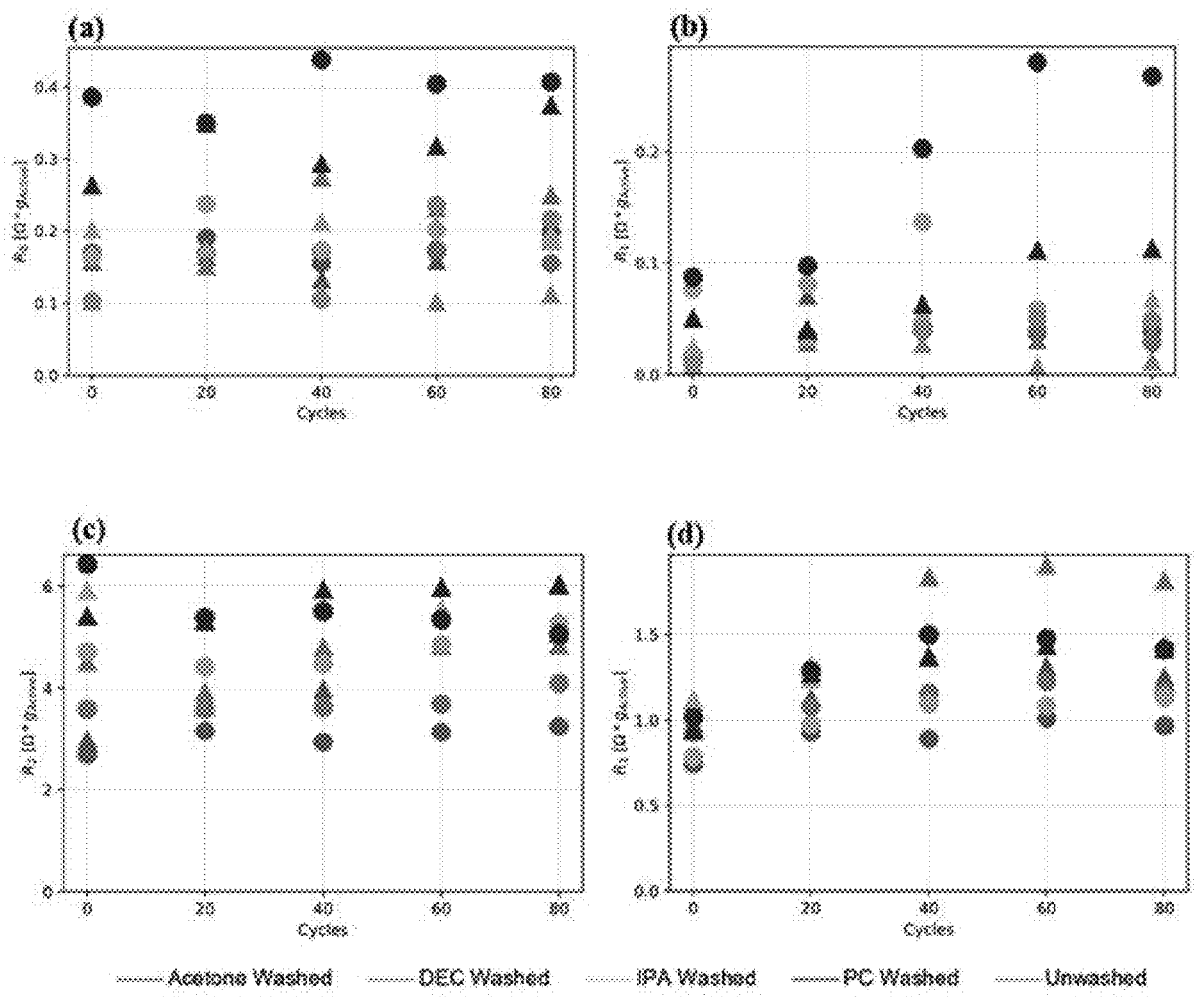
FIG. 8 illustrates panel (a) $R_0$: Ohmic resistance; panel (b) $R_1$: High frequency (>104 Hz) contact resistance; panel (c) $R_2$: The dominant contribution to impedance near $10^3$ Hz, primarily attributable to cathodic contact resistance; and panel (d) $R_3$: The dominant contribution to impedance near $10^1$ Hz, attributable to interfacial charge transfer and diffusion of charged species through the porous electrodes, according to some aspects of the present disclosure.

The evolution of the ZARC elements $R_0$, $R_1$, $R_2$ and $R_3$ during cycling for each of the washed-relithiated electrodes 125 is shown in panels a-d of FIG. 8, respectively. The Ohmic resistance ($R_0$; FIG. 8a) is not expected to be influenced by washing, and this is observed for most cells. However, PC-W-R electrodes 125 display significantly higher Ohmic resistance than any other cells. This suggests that the PC wash may leave a residue on the cathode surface, increasing electronic resistance. This is verified by analysis of the high frequency (>$10^4$ Hz) contact resistance ($R_1$; panel b of FIG. 8). PC-W-R cells—and, to some extent, IPA-W-R cells—display much larger $R_1$ values than all other electrodes 125, including unwashed electrodes 125, and these $R_1$ values continue to grow during cycling of the PC-W-R cells. In fact, one of the unwashed cells is found to have a lower impedance than either the IPA-W-R or PC-W-R electrodes 125 panel (b) of FIG. 8. Thus, while PC and IPA washing is beneficial for the overall stability of cell impedance, these solvents may also have deleterious impacts on the electrodes 125.

Cell polarization is found to be dominated by the contributions of ZARC elements $R_2$ and $R_3$ (96.5% of the overall cell polarization resistance). $R_2$ dominates the impedance response near $10^3$ Hz and is attributed to contact resistance. While washing does not necessarily reduce the contact impedance of the electrodes 125, all washes improve the stability of contact resistance during cycling. This can be observed in the relatively stable $R_2$ during cycling of washed cells. Acetone and DEC are the most effective among the exemplary solvents in terms of reducing contact resistance compared to the unwashed case. The contact resistance of Ac-W-R and DEC-W-R electrodes 125 is lower than that of U-R electrodes 125 immediately following formation and remains consistently lower than both PC-W-R and IPA-W-R electrodes 125 during cycling.

Washing with any solvent also reduces the impedance contribution of $R_3$, which dominates the overall impedance near $10^1$ Hz and is attributed to interfacial charge transfer and charged species diffusion through the porous electrodes 125. Unlike $R_2$ values, which remain stable for all washed electrodes 125 during cycling, $R_3$ values exhibit a slight increase during the first 40 cycles. As the low-frequency $R_3$ contribution is associated with bulk properties, such as interfacial charge transfer and ionic diffusion processes, the observed increase in $R_3$ upon initial cycling of relithiated electrodes 125 may suggest changes to crystal structure or internal stoichiometry as the relithiated particles redistribute lithium.

Generally, the coefficient of variance for $R_3$ is found to be much less than the coefficient of variance of $R_2$ (0.136 for $R_3$ after formation, c.f. 0.282 for $R_2$ after formation). This implies that variations in solvent treatment have the greatest effect on high-frequency (surface-dependent) properties, such as contact resistance. Ac-W-R and DEC-W-R electrodes 125 show the greatest reduction in overall impedance compared to U-W electrodes 125, consistent with electrochemical cycling results. Between these two conditions, DEC-W-R electrodes 125 show a higher overall impedance but exhibit improved impedance stability throughout subsequent cycling.

FIG. 8 shows deconvolutions of contributions to cell impedance: Ohmic resistance and three ZARC elements, tracked during electrochemical cycling of relithiated cells. Panel (a) $R_0$: Ohmic resistance; panel (b) $R_1$: High frequency (>10$^4$ Hz) contact resistance; panel (c) $R_2$: The dominant contribution to impedance near $10^3$ Hz, primarily attributable to cathodic contact resistance; panel (d) $R_3$: The dominant contribution to impedance near $10^1$ Hz, attributable to interfacial charge transfer and diffusion of charged species through the porous electrodes 125.

Figure 9:
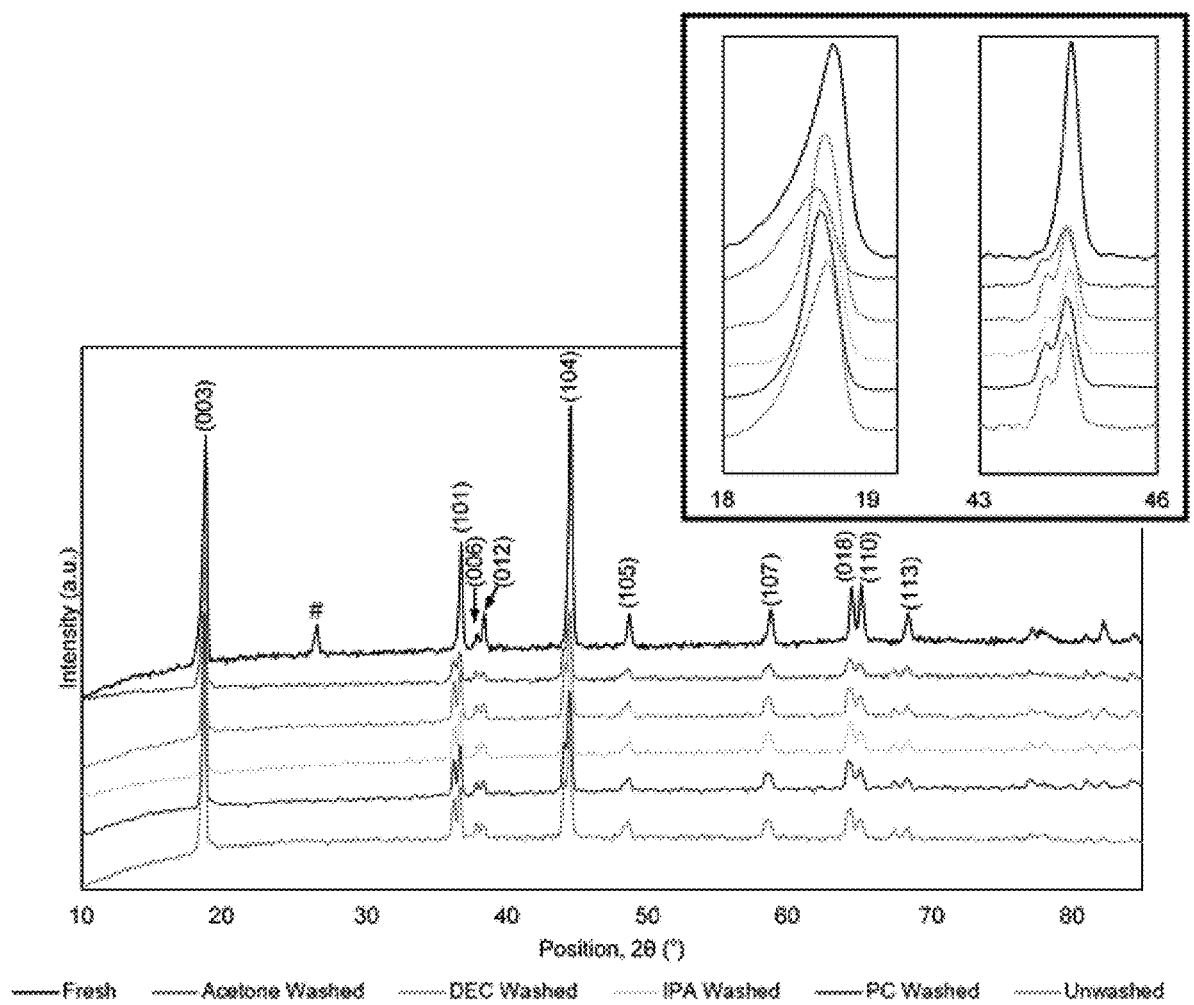
FIG. 9 illustrates X-ray diffraction (XRD) patterns for fresh, unwashed, and solvent-washed electrodes, prior to relithiation, according to some aspects of the present disclosure.

Structural effects of both aging and subsequent solvent washing were assessed via X-ray diffraction. XRD patterns for fresh, unwashed, and solvent-washed electrodes 125, prior to relithiation 220, are shown in FIG. 9; selected parameters from Rietveld refinement are given in Table 3. Refinement was conducted using layered (trigonal α-NaFeO$_2$-¬-type R$\bar{3}$m), spinel (cubic Co$_3$O$_4$-type Fd3m), and rock salt (cubic NiO-type Fm3m) phases. Pristine electrode 125 shows a strong layered composition, with clear peak splitting between (006)/(012) peaks and (018)/(110) peaks indicating hexagonal ordering. Rietveld refinement suggests a composition of 97% layered R$\bar{3}$m structure, with about 3% phase impurities. The peak at approximately 26.8° has previously been reported in composite cathode electrodes 125 and has been attributed to graphitic conductive carbon. For the fresh electrodes 125, the a and c lattice parameters obtained for the trigonal phase are consistent with previous reports.

that the phase change behavior of NMC electrodes 125 is more complex than for other lithium-oxides, such as LiCoO$_2$ (LCO). LCO materials are known to form cubic spinel phases, such as Co$_3$O$_4$ and LiCo$_2$O$_4$, upon extended cycling. In addition, NMC electrodes 125 may also form rock salt phases due to Li$^+$ deficiency and transition metal (Ni$^{2+}$) migration. Rock salt phase is found to be dominant under oxidative high-voltage environments. The formation of both spinel and rock salt phases is observed for the present material, consistent with previous reports on NMC electrodes 125 and isostructural layered oxides.

Quantified refinement results suggest that phase composition may be slightly dependent on washing condition, implying that washing may play a role in structural rearrangement, as well as impacting surface/lattice chemistry. All washed electrodes 125 show a lower percentage of layered phase than unwashed electrodes 125 but vary in the relative percentages of spinel and rock salt phases. In particular, Ac-W, DEC-W, and PC-W electrodes 125 all show approximately 92-92.5% layered phase, with the percentage of spinel phase increasing (rock salt phase decreasing) as Ac-W<DEC-W<PC-W. Interestingly, this is in precise inverse proportion to the electrochemical capacity of these electrodes 125. The IPA-W electrode 125 shows the lowest percentage of layered phase (90%), and the highest percentage of spinel phase, and has the next-to-lowest electrochemical performance among the wash conditions.

The association of increased electrochemical performance (washed electrodes 125) with a reduced percentage of layered structure (as compared to the unwashed electrode 125) appears to run counter to previous reports. Both spinel and rock salt phases are reported to lead to increased charge-transfer resistance, and thus decreased performance relative to the layered phase. However, this apparently anomalous behavior may be explained by the emergence of an additional phase, manifest as the lower-angle split of the (101) peak and a lower-angle shoulder of the (104) peak. Rietveld refinement using the three phases commonly reported for degraded NMC electrodes 125 (layered, spinel, rock salt) does not capture the emergence of these peaks. Notably, this phase is present for both unwashed and washed electrodes 125, implying that the electrode 125 degradation, rather than the washing procedure, is responsible for the evolution of this additional phase.

Analysis of a and c lattice parameters, shown in Table 3, provides additional information regarding the physical

TABLE 3 lattice parameters and phase distributions for pristine, aged-unwashed, and aged-washed electrodes 125. Lattice parameters are reported for the trigonal (R$\bar{3}$m space group) phase, with estimated standard deviation (ESD) <0.004 Å for all electrodes 125. ESD for phase quantities is reported as a percentage.

| Sample | a (Å) | c (Å) | α-NaFeO$_2$ (R$\bar{3}$m) (% ± ESD) | % Co$_3$O$_4$ (Fd3m) (% ± ESD) | NiO (Fm3m) (% ± ESD) |
|---|---|---|---|---|---|
| Fresh | 2.866(4) | 14.23(9) | 96.96 ± 0.70 | 2.38 ± 0.57 | 0.66 ± 0.46 |
| Unwashed | 2.871(6) | 14.27(6) | 93.60 ± 1.30 | 4.10 ± 1.10 | 2.28 ± 0.71 |
| Acetone Washed | 2.867(7) | 14.25(8) | 92.50 ± 1.00 | 5.97 ± 0.87 | 1.54 ± 0.59 |
| DEC Washed | 2.870(7) | 14.27(1) | 92.20 ± 1.30 | 7.30 ± 1.10 | 0.53 ± 0.75 |
| IPA Washed | 2.869(1) | 14.27(1) | 90.60 ± 1.00 | 9.40 ± 1.00 | 0.0 |
| PC Washed | 2.870(0) | 14.27(0) | 91.80 ± 1.10 | 8.20 ± 1.10 | 0.0 |

For all aged electrodes 125, peak splitting is observed in several dominant peaks ((101), (104), (105), (113)), implying phase transformation. In particular, refinement suggests the growth of cubic spinel and rock salt phases, at the expense of the trigonal layered phase. It has been suggested mechanism of structural change between fresh, unwashed, and washed electrodes 125. Specifically, an increase in c lattice parameter, corresponding to a shift of the (003) peak to lower angles, is observed for all aged electrodes 125, as compared to the fresh electrode 125. This suggests increased electrostatic repulsion between $MO_2$ (M=Ni, Co, Mn) layers along the c axis induced by lithium deficiency. Nearly identical c lattice parameter values are observed for all aged cells, with the exception of the Ac-W electrode 125, which shows a lower value. Ideally, in a remediated cathode, the (003) peak should shift back to a higher angle (lower c lattice parameter value); this would indicate reduced oxygen repulsion, ostensibly due to restoring Li stores. However, the Ac-W electrode 125 analyzed had not yet been relithiated, further supporting the notion of reduction-induced structural rearrangement during the acetone-washing process.

Further, the a lattice parameter is anticipated to decrease following electrochemical cycling and resulting delithiation (or depletion). This has been attributed to the oxidation of $Ni^{2+}$ to $Ni^{3+}$ to achieve charge compensation in the delithiated state, leading to a contraction of the a plane due to the smaller ionic radius of $Ni^{3+}$. In the present analysis, though, all aged electrodes 125 show an increase in a lattice parameter relative to the fresh electrode 125, with the a lattice parameter value increasing in relative inverse to electrochemical performance. This phenomenon may again be explained by changes to the lattice oxygen framework. In the aged cathode material (i.e., electrode 125) herein, it is anticipated that lattice oxygen has been lost through conversion to electrolyte degradation species and phase transformation. Charge compensation for the resulting oxygen vacancies may be achieved via the reduction of $Ni^{3+}$ to $Ni^{2+}$, in direct opposition to the oxidation process anticipated in the delithiated state. It is probable that both processes are occurring simultaneously, with the reductive pathway apparently outweighing the oxidative one. It is possible that the reintroduction of lattice oxygen via solvent washing induces some oxidation of $Ni^{2+}$ back to $Ni^{3+}$, resulting in a lower a lattice parameter for washed, versus unwashed, electrodes 125.

Taken together, the observed trends in lattice parameter values could also suggest the presence of positively charged electrolyte/additive degradation products within the Li layer, which are removed to various extents by the four solvent washing conditions. These products may both sterically and electrostatically increase repulsion between the oxygen layers (c lattice expansion), while causing transition-metal reduction to achieve charge compensation (a lattice expansion). The acetone-washing condition is found to restore these lattice parameters to values closest to that of the fresh electrode 125, corresponding with the greatest improvement in electrochemical capacity.

In addition to changes to the bulk lattice oxygen network, solvent washing may alter the surface chemistry of end-of-life cathodes by removing electrolyte degradation species, residual electrolyte additives, and reaction products evolving from both electrolyte and additives during the functional lifetime of the battery. Changes to the chemistry of the aged electrode 125 material following washing in each of the four solvents was assessed through the preparation of highly concentrated wash solutions, which were then further concentrated using solid phase microextraction (SPME).

GC-based methods to assess the chemical composition of end-of-life degradation products occurring in the liquid-phase electrolyte or the gas phase following cycling and/or cell abuse have been utilized. However, this is the first known report investigating the selectivity of various solvents for electrolyte and CEI components on commercially relevant NMC cathode materials (i.e., electrodes 125). GC-MS spectra for each of the wash solutions are shown in FIG. 6, along with a corresponding blank for each solvent. Comparison with a solvent blank is crucial to eliminate background signals evolved from both solvent impurities and inherent SPME fiber signals, as well as any species that may evolve from fiber-solvent interactions. Species unique to the wash solution (i.e., not present in the blank) are indicated with vertical bars, and a compiled tabulation of all species removed, above the instrument detection limit, is found in Table 4. Table 4 also includes an assignment of the presumed origin of each chemical species.

The species removed by solvent washing may be grouped into three broad categories: electrolyte degradation products, additives, and electrolyte-additive reaction products. Electrolyte degradation products are primarily carbonate derivatives and are the typically reported components of the CEI. This process includes initial adsorption of carbonate solvent onto the oxide surface, followed by a nucleophilic reaction of surface oxygen with the carbonate's carbonyl carbon.

Figure 10:
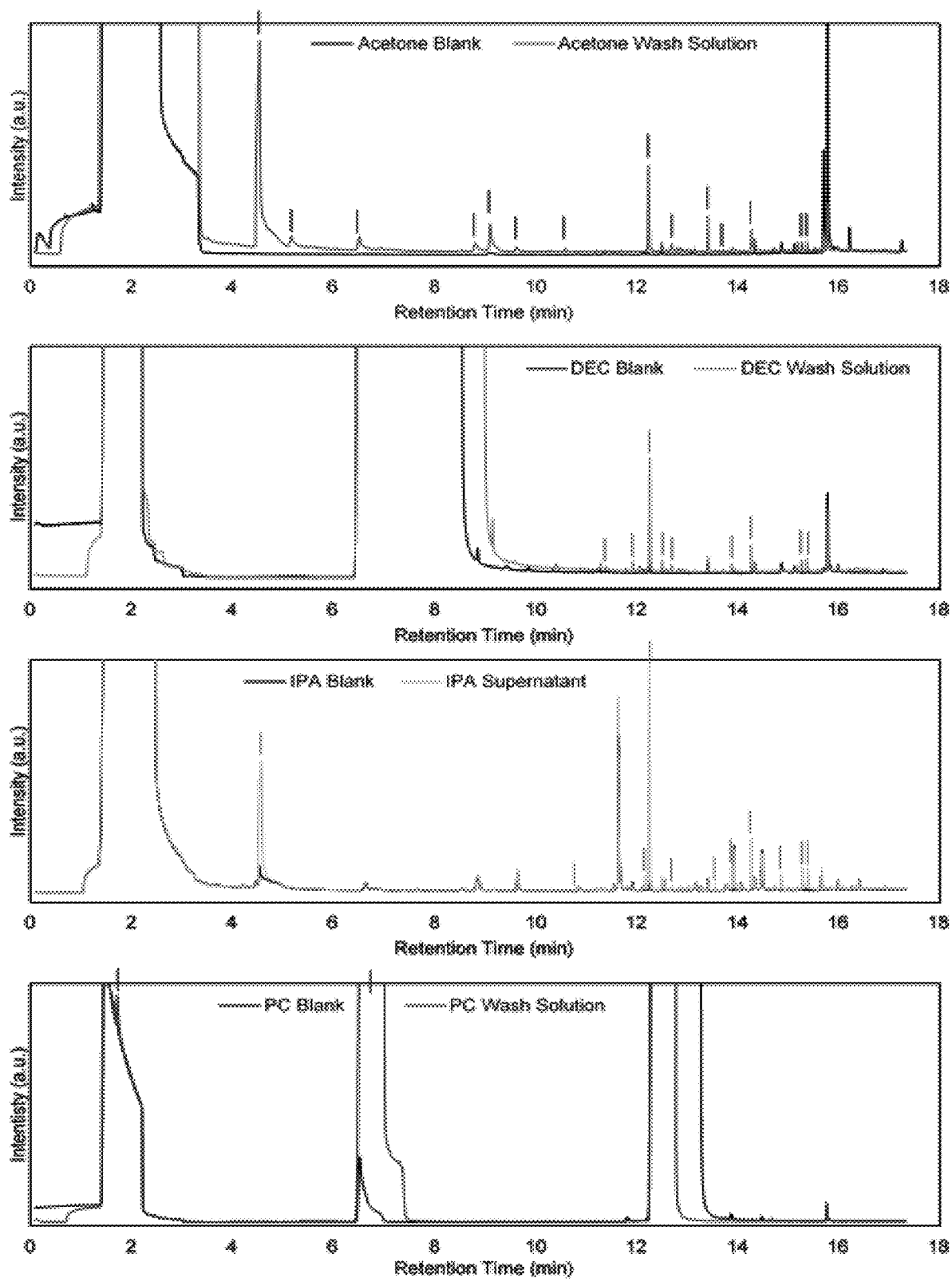
FIG. 10 illustrates solid-phase micro-extraction (SPME) gas chromatography-mass spectrometry (GC-MS) spectra of wash solutions for each of the four analyzed solvents, along with a corresponding solvent blank, according to some aspects of the present disclosure.

FIG. 10 shows SPME GC-MS spectra of wash solutions for each of the four analyzed solvents, along with a corresponding solvent blank. Chemical species removed from the aged NMC (i.e., appearing in the wash solution or appearing with significantly elevated intensity in the wash solution) are indicated with vertical lines and are listed in Table 4.

Table 4 shows chemical compounds removed from end-of-life NMC via sonication in each of four solvents, arranged with increasing retention time. Check mark indicates that the given compound was detected in the wash solution of the given solvent; dashed line indicates no detection of the given compound in the wash solution of the given solvent, but potential confounding due to co-elution with another chemical species; "X" indicates no detection of the given compound, with no potential confounding. Star symbol (✶) indicates a species that was observed in both blank and wash solution.

TABLE 4 chemical compounds removed from end-of-life NMC via sonication in each of four solvents, arranged with increasing retention time.

| # | Compound | Source | RT | Acetone | DEC | IPA | PC |
|---|---|---|---|---|---|---|---|
| 1 | Diisopropyl carbonate | Elec. Deg. | 1.71 | X | X | X | ✓ |
| 2 | Ethylene glycol | Additive | 4.53 | ✓ | X | ✓ | X |
| 3 | 1-[(4-bromo-2,5-dimethoxyphenyl)methyl]- | Elec.-Add. Reac. | 5.15 | ✓ | X | X | X |
| 4 | Diethyl carbonate | Elec. Deg. | 6.60 | ✓ | — | X | ✓ |
| 5 | 5-(1-methylethylidene)-1,3-cyclopentadiene | Elec.-Add. Reac. | 8.80 | ✓ | — | X | X |
| 6 | Diacetone alcohol | Solvent Reac. | 9.10 | ✓ | — | X | X |
| 7 | Bicyclo[2.1.1]hex-2-ene, 2-ethenyl | Elec.-Add. Reac. | 9.62 | ✓ | X | X | X |
| 8 | Cyclohexanone | Elec.-Add. Reac. | 10.57 | ✓ | X | X | X |
| 9 | 2,3-heptadien-5-yne, 2,4-dimethyl | Elec. Deg. | 10.84 | X | X | ✓ | X |
| 10 | 2,5,6-trimethyl decane | Elec. Deg. | 11.38 | X | ✓ | X | X |
| 11 | Hydrazine-carboxylic acid, ethyl ester | Elec.-Add. Reac. | 11.93 | X | ✓ | X | X |

TABLE 4-continued chemical compounds removed from end-of-life NMC via sonication in each of four solvents, arranged with increasing retention time.

| # | Compound | Source | RT | Acetone | DEC | IPA | PC |
|---|---|---|---|---|---|---|---|
| 12 | Propyl nitrite | Additive Deg. | 12.16 | X | X | ✓ | X |
| 13 | Ethylene carbonate | Elec. Deg. | 12.23 | ✓ | ✓ | ✓ | X |
| 14 | Diethyl butyl phosphate or diethyl pentyl phosphate | Elec. Deg. | 12.69 | ✓ | ✓ | ✓ | X |
| 15 | 1-hexadecanol or 1-tetradecene | Elec.-Add. Reac. | 13.40 | ✓ | ✱ | ✓ | X |
| 16 | Diethyl 2,5-Dioxahexanedioate | Elec. Deg. | 13.88 | ✓ | ✓ | ✓ | X |
| 17 | Biphenyl | Additive | 14.26 | ✓ | ✓ | ✓ | X |
| 18 | Ethyl 4-ethoxybenzoate | Elec.-Add. Reac. | 14.85 | ✓ | ✓ | ✓ | X |
| 19 | Diethyl phthalate | Elec.-Add. Reac. | 15.17 | ✓ | ✓ | ✓ | X |
| 20 | Diethyl terephthalate | Elec.-Add. Reac. | 15.26 | ✓ | ✓ | ✓ | X |

Deintercalated Li-ions transfer to the surface and are dissolved in the carbonate adsorbate phase, leading to the formation of lithiated reaction products. The reactivity was remarkably similar across NMC electrodes 125 and all carbonate electrolytes. In particular, nucleophilic attack by oxygen (surface and bulk lattice) and migration and solvation of Li at the surface are believed to be the dominant mechanisms resulting in the formation of electrolyte degradation products. Several of the components detected in the wash solution (Table 4) are known electrolyte components and may have been adsorbed on the surface (ethylene carbonate (EC; #11), diethyl carbonate (DEC; #4)); others contain structural moieties (carbonate, hydrocarbon, P=O) suggesting electrolyte degradation products that may have been covalently bound to the NMC surface. These compounds include diisopropyl carbonate (#1); 2,4-dimethyl-2, 3-heptadien-5-yne (#9); 2,5,6-trimethyl decane (#10); butyl diethyl phosphate/diethyl pentyl phosphate (indistinguishable in the present analysis; #14); and diethyl 2,5-dioxahexanedioate (#16).

In commercial cells, additives are typically included to address specific deficiencies in the standard carbonate solution, or to provide performance enhancement or safety protection under specific operating conditions. It is probable that the commercial cell from which the present cathode material (i.e., electrode 125) was harvested contained several to dozens of additives, and the chemistry of the species recovered from the wash solutions supports this notion. Ethylene glycol-based additives, such as ethylene glycol bis (propionitrile) ether (EGBE) have been reported to enhance the stability and morphology of both the CEI and the SEI, and ethylene glycol (#2) has also been investigated for low-temperature performance enhancement. Propyl nitrite (#12) is the probable reduced product of propyl nitrate, an additive used for SEI formation. Biphenyl (#17) is an additive intended to form the CEI or form the SEI in cases of overcharge (a so-called "shutdown molecule").

Finally, several of the compounds recovered from the wash solutions appear to be reaction products between additives and electrolyte components, based on their chemical composition. The combination of Li and F species in the electrolyte and transition metal species such as Co, which is frequently used in catalysis, serves as a highly reactive environment for the evolution of complex chemical species. In the present analysis, identified seven such species are identified. While identifying these species based on mass fragment reconstruction has been attempted, NIST database matching, and reaction chemistry rationale, it should be noted that such reaction products tend to be structurally complex and often lack appropriate standards for identification. In Table 4, these reaction products have been identified according to the highest-percentage mass spectrum NIST match, with the recognition that precise stoichiometry and isomeric structure may vary slightly from these assignments. Thus, the present disclosure aims to emphasize the reactive pathways capable of producing species with the observed mass fragment moieties, rather than the definitive identity of specific reaction products.

Piperazine,1-[(4-bromo-2,5-dimethoxyphenyl)methyl]-(#3) is a Br-containing, bicyclic, aromatic compound that may have formed from the reaction of a Br-containing additive (e.g., 4-bromobenzyl isocyanate or 3-bromothiophene, both intended to polymerize at the cathode; or α-bromo-γ-butyrolactone, intended to form the SEI or reduce corrosion) with another aromatic additive. 1,3-cyclopentadiene, 5-(1-methylethylidene)-(#5) may have evolved from cyclohexylbenzene, an additive used for overcharge protection that unstable in the presence of oxidizing agents. Bicyclo[2.1.1]hex-2-ene, 2-ethenyl (#7) is a bicyclic alkene, perhaps evolved from aromatic additives such as cyclohexylbenzene. Cyclohexanone (#8) was likely evolved from the oxidation of cyclohexane in air, which typically proceeds in the presence of Co catalysts. Cyclohexane has been used to improve the first-cycle efficiency by increasing the elasticity of the polyvinylidene difluoride (PVdF) binder and improving the wettability of the separator. Hydrazine-carboxylic acid, ethyl ester (#11) could form from the reaction of carbonate species with amine-containing compounds. Amines are typically added to react with residual H2O, thereby prevent HF formation (so-called HF scavengers). Compound #15 is a long-chain hydrocarbon (mass spectra corresponding to either 1-hexadecanol or 1-tetradecene, with equal NIST matching confidence), suggesting an origin as an electrolyte degradation product, but also contains alcohol or alkene moieties, implying further reaction, perhaps with additives. Ethyl 4-ethoxybenzoate (#18) contains carbonate and ester moieties—likely evolved from electrolyte—but also aromaticity, ostensibly from a benzene derivative additive such as biphenyl or cyclohexylbenzene. Diethyl phthalate (#19) and 1,4-diethyl terephthalate (#20) are both phthalate esters, which may also have evolved from the reaction of a carbonate degradation product and a benzene derivative. Finally, diacetone alcohol (#6) appears to be an aldol condensation product of acetone, implying that this species may have been formed via catalysis during the washing process, rather than being removed from the aged electrode 125.

With the exception of electrolyte solvent residues (DEC, EC) and possibly unreacted additives (ethylene glycol, biphenyl), which may have been adsorbed on the NMC surface, it is anticipated that the species removed via solvent washing had been ionically or covalently bound within the NMC lattice. This would be consistent with their mechanism of their evolution, involving the covalent interactions with surface oxygen described for electrolyte degradation products and/or catalytic reactions with the transition metals. Thus, effective removal of these products may involve chemical reaction in addition to a pure solvation mechanism.

The adage "like-dissolves-like" offers an initial rationale for the nature of the products removed by each solvent. Acetone, a polar ketone, is found to dissolve polar, non-H-bonding compounds, but is less effective in solvating nonpolar compounds. Diethyl carbonate, a carbonate ester, effectively removes weakly polar, non-H-bonding compounds, but is unable to solvate more highly polar compounds. Isopropyl alcohol is an alkyl alcohol, and as such dissolves polar, H-bonding compounds, but is ineffective at dissolving nonpolar species. Finally, propylene carbonate (PC) is a cyclic carbonate ester, anticipated to dissolve polar, non-H-bonding compounds—similar to acetone. However, PC is found to be largely ineffective at removing any species whatsoever, under the present analysis conditions. This is somewhat surprising, as PC has previously been employed as a solvent for GC-MS analysis of electrolyte and electrolyte degradation products. The lack of solvation activity may be explained by a significant increase in DEC between the blank and the wash solution, suggesting a potential reactive conversion from PC to DEC. Such a process has been reported for the synthesis of DEC in the presence of an alcohol and transition-metal catalysts, an environment quite similar to the present system. PC is also expected to have greater steric hindrance due to its cyclic structure, as compared to the smaller molecular form of the other solvents.

In addition to polarity, structural reactivity may be considered in the assessment of the various solvents' efficacy in the context of capacity restoration. The structure of each of the four solvents, which has briefly been discussed, may affect both the ability to induce surface transformation (i.e., reintroduction of lattice oxygen) and the removal of passivating or electrochemically interfering degradation species. As a ketone, acetone is the most strongly nucleophilic of the solvents used in this example due to lone-pair electrons on the carbonyl carbon with no additional resonance-stabilizing moieties. This makes acetone broadly reactive to both electrolyte degradation products and a variety of organic additives. Carbonate esters, such as diethyl carbonate and propylene carbonate, are less nucleophilic, due to the stabilizing resonance of the ester oxygen. This may be beneficial in the removal of certain electrolyte degradation products but is unlikely to be effective across a broad and chemically diverse class of additives. Alcohols, such as isopropyl alcohol, are amphoteric, suggesting both nucleophilic and electrophilic reactivity; however, H-bonding properties cause high intra-molecular interactions between solvent molecules, reducing reactivity.

Thus, the capacity recovery enabled through solvent washing (i.e., treating 210) and relithiation 220 is believed to largely depend on the solvent chemistry—both polarity and underlying structure, including sterics. Acetone is found to successfully remove all three classes of end-of-life compounds identified: electrolyte degradation products, additives, and electrolyte-additive reaction products. DEC is able to remove electrolyte degradation products and certain electrolyte-additive reaction products but is unable to remove polar additives—notably ethylene glycol, an insulating hydrocarbon that appears at high intensities in acetone and IPA washes in this example. IPA removes polar additives and moderately polar or polarizable electrolyte degradation products but is ineffective at removing nonpolar electrolyte degradation products and several weakly polar or nonpolar electrolyte-additive reaction products. Finally, PC is found to be a relatively ineffectual solvent in the present analysis. This may be the result of steric hindrance and reactivity in the presence of alcohol-containing additives and transition metal catalysts to form DEC.

Heavily degraded commercial cathode material (i.e., electrode 125) was cycled (i.e., used or delithiated) and calendar aged to about 30% state-of-health, has been significantly rejuvenated through a combination of solvent washing (i.e., treating 210) and electrochemical relithiation 220. In particular, sonication of spent electrode 125 in acetone followed by relithiation 220 enables capacity recovery of up to about 174% relative to unwashed/relithiated electrodes 125. Capacity remained stable for remediated cathodes over at least 80 cycles post-relithiation.

Electrochemical, structural, and chemical analysis of electrodes 125 washed in four different solvents (acetone, diethyl carbonate, isopropyl alcohol, and propylene carbonate) suggest a multi-fold role of the organic solvent in the observed capacity performance. Differential capacity analysis implies a shift in the mechanism of electroactivity between fresh and aged electrodes 125, with capacity recovery for washed electrodes 125 largely attributable to increased anionic redox, rather than recovery of transition metal redox. This indicates that anionic redox—which has been reported to decrease due to the irreversible loss of lattice oxygen during cycling—may, in fact, be recovered by solvent interactions. The present disclosure includes that use of nucleophilic solvents, in conjunction with mechanically aggressive washing conditions (sonication), may reduce the NMC surface and allow for reintroduction of oxygen back into the bulk lattice.

Structural analysis provides further evidence for this mechanism. All aged electrodes 125 (unwashed and washed) shows evidence of structural rearrangement, manifest as the evolution of spinel and rock salt phases. Rietveld analysis of the layered phase in each electrode 125 reveals an increase in c lattice parameter for aged electrodes 125 as compared to pristine material, consistent with transition metal-oxygen repulsion induced by delithiation. However, acetone-washed electrodes 125 show a lower c parameter prior to relithiation 220, suggesting that bulk structural rearrangement may be achieved during the solvent washing process. Further, reduced a lattice parameter values for washed electrodes 125 as compared to unwashed electrodes 125 may be attributed to the oxidation of $Ni^{2+}$ back to $Ni^{3+}$, ostensibly due to lattice oxygen reintroduction during solvent washing. Additionally, positively charged electrolyte/additive degradation products may accumulate within the Li layer during cycling/aging, inducing steric and electrostatic repulsion between the oxygen layers (c lattice expansion) and transition-metal reduction (a lattice expansion). Selective removal of these degradation products may account for the observed lattice parameter shifts between washing conditions.

Finally, both impedance and chemical analysis suggest the role of surface chemistry on electrode 125 performance. While any form of solvent washing is found to decrease overall impedance and reduce impedance growth during subsequent cycling, the nature of the solvent is found to impact charge-transfer resistance most dramatically. Specifically, acetone- and DEC-washed electrodes 125 show reduced charge-transfer resistance, suggesting the removal of insulating surface species. Analysis of highly concentrated wash solutions reveals three categories of species removed from commercial used electrode 125 by solvent washing: electrolyte degradation products, additives, and electrolyte-additive reaction products. Solvent structure—polarity, resonance stability, and possibly steric hindrance—is found to impact selectivity for various species, and the removal of passivating surface species via washing is believed to contribute to the observed capacity recovery for washed electrodes 125. Acetone, a ketone with moderate polarity and the highest nucleophilicity of the solvents used in this example, appears to enable most effective removal of a broad scope of degradation products covalently bound within the NMC lattice. However, it is probable that tailored gradient washing with multiple solvents may enable further improvements in the removal of degradation species.

The present analysis implies a complex role of solvent washing in the performance of aged electrodes 125 and offers a promising path towards the integration of washing techniques in a broader electrode 125 recycling protocol (i.e., method 200). Rather than simply removing surface adsorbed species, as previous reports have implied, solvent washing (i.e., treating 210)—particularly under mechanically aggressive conditions, such as sonication—may be impacting the bulk lattice oxygen network, restoring anionic redox capacity. Washing has been used in limited applications to induce surface reconstruction in pristine electrodes 125 post-synthesis, and such reconstruction may be possible in aged electrodes 125 as well.

Thus, the present disclosure presents a simple and cost-effective solvent-washing (i.e., treating 210) technique that may be exploited in conjunction with relithiation 220 to enable optimized cathode rejuvenation. The present work should be expanded to multiple commercial end-of-life electrodes 125 to verify the breadth of these findings.

Figure 11:
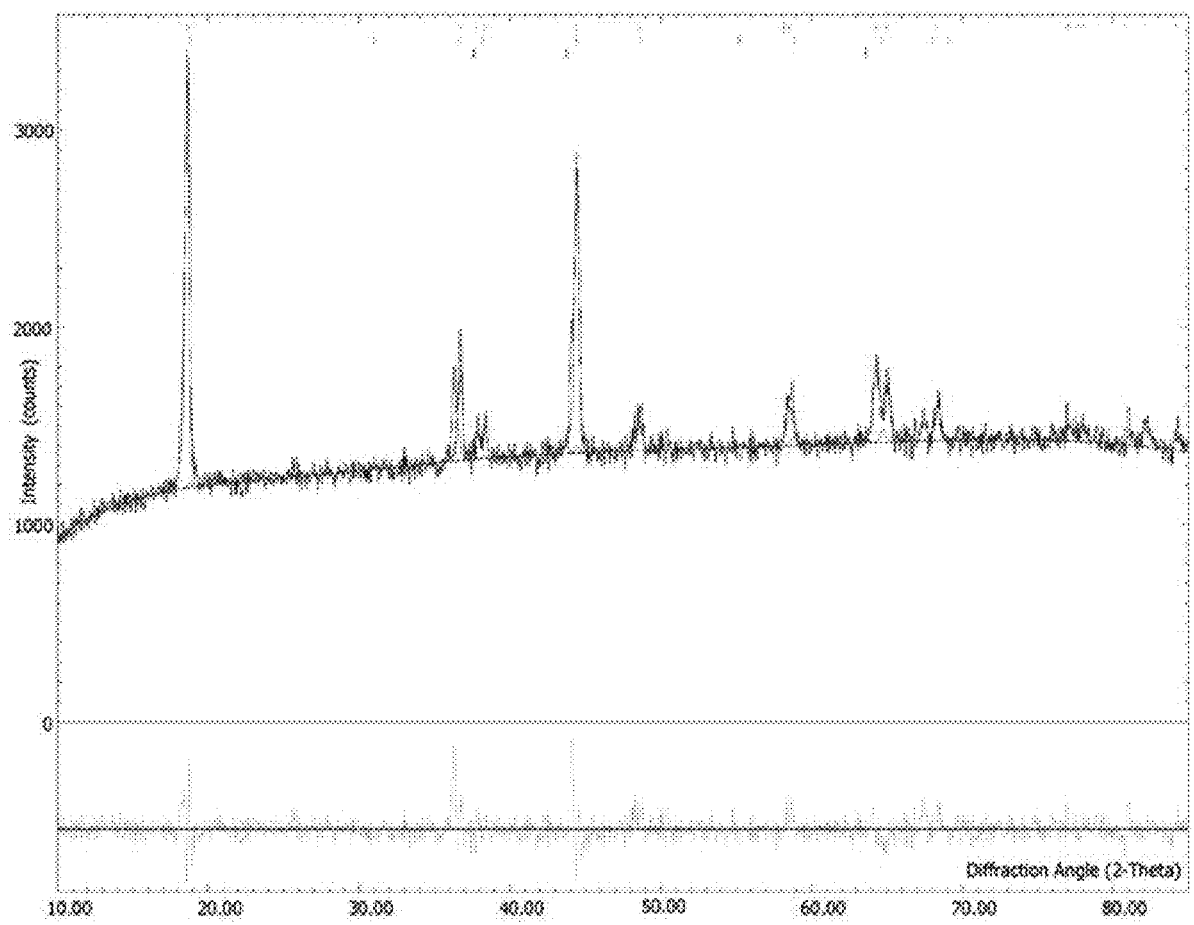
FIG. 11 illustrates representative XRD diffractogram of fresh NMC cathode material, showing $\alpha$-$NaFeO_2$, $Co_3O_4$, and NiO phases, according to some aspects of the present disclosure.

FIG. 11 shows a representative XRD diffractogram of fresh NMC cathode material (i.e., electrode 125), showing α-$NaFeO_2$, $Co_3O_4$, and NiO phases. The presence of an additional, as-yet-unassigned phase is implied by the lower-angle splitting of the (101) peak and a lower-angle shoulder of the (104) peak. Observed, calculated, differences, and background intensities are displayed, and the hkl line positions for α-$NaFeO_2$ (top), $Co_3O_4$ (middle), and NiO (bottom).

Figure 12:
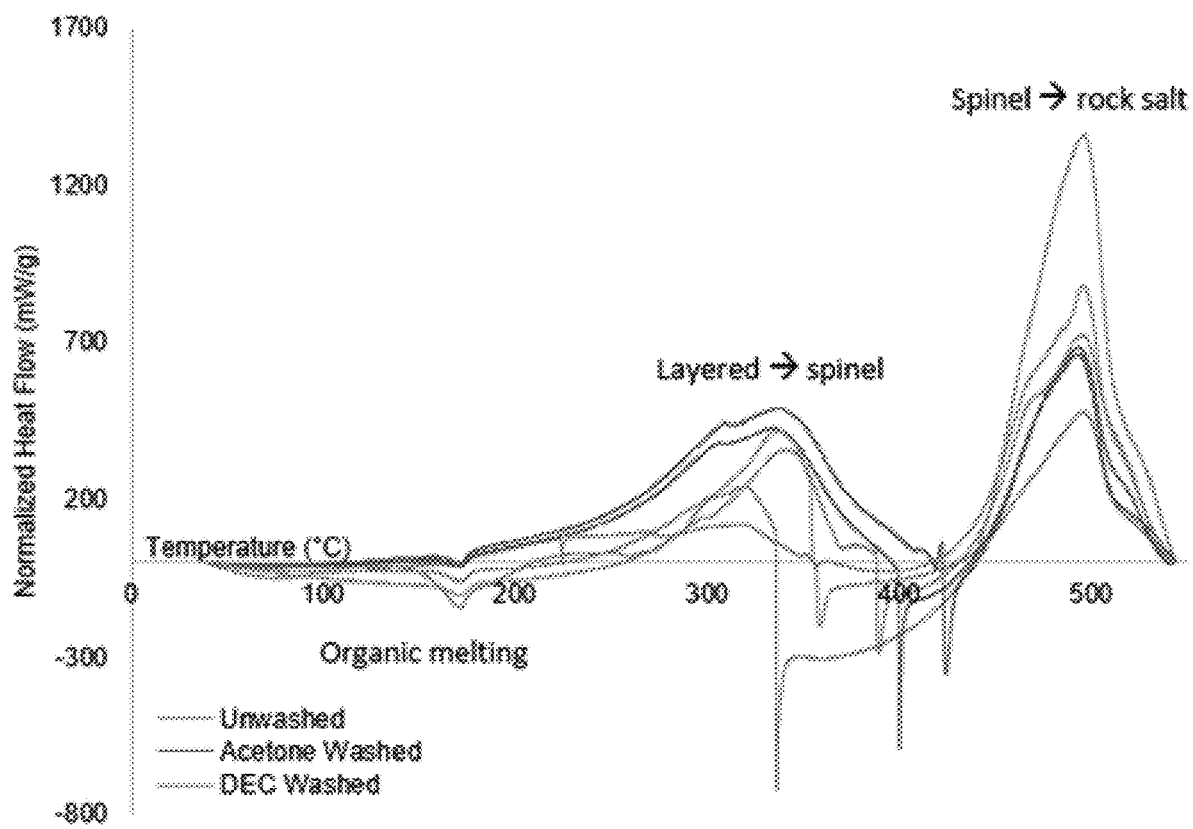
FIG. 12 illustrates differential scanning calorimetry (DSC) analysis of acetone and DEC-washed cycle-aged cathode material, in comparison to unwashed cycle-aged cathode material, according to some aspects of the present disclosure.

FIG. 12 shows differential scanning calorimetry (DSC) analysis of acetone and DEC-washed cycle-aged cathode material (i.e., electrode 125), in comparison to unwashed cycle-aged cathode material (i.e., electrode 125).

Examples

Example 1. A method for repurposing a lithium-ion battery, the method comprising, in order:
removing at least a portion of the electrode of the lithium battery;
treating the portion of the electrode;
recasting the portion of the electrode; and
relithiating the electrode.

Example 2. The method of Example 1, wherein the electrode comprises a cathode or a material capable of performing as a cathode.

Example 3. The method of Example 1, wherein the lithium-ion battery comprises a coin cell or pouch cell.

Example 4. The method of Example 1, wherein the treating comprises exposing the portion of the electrode to a solvent.

Example 5. The method of Example 4, wherein the solvent comprises a ketone.

Example 6. The method of Example 5, wherein the ketone comprises at least one of acetone, benzophenone, or acetophenone.

Example 7. The method of Example 4, wherein the exposing comprises at least one of sonicating, stirring, or soaking the portion of the electrode in the solvent.

Example 8. The method of Example 1, wherein:
the lithium-ion battery comprises a layer of foil, and
the removing comprises scraping the electrode from the layer of foil.

Example 9. The method of Example 1, wherein:
the lithium-ion battery comprises a layer of foil, and
the recasting comprises attaching the electrode on the layer of foil.

Example 10. The method of Example 1, wherein the lithium-ion battery comprises a wound or jelly roll design.

Example 11. The method of Example 10, wherein the relithiating comprises:
securing a first end of the electrode to a first pin;
securing a second end of the electrode to a second pin;
positioning a chamber containing a layer of lithium and an electrolyte solution between the first pin and the second pin;
extending at least a portion of the electrode through the chamber; and
providing a voltage to the layer of lithium; wherein:
a terminal is configured to provide the voltage,
the voltage is configured to motivate at least one lithium ion to move from the layer of lithium, through the electrolyte solution, and to the electrode.

Example 12. The method of Example 11, wherein providing a voltage comprises applying a constant voltage.

Example 13. The method of Example 12, wherein the constant voltage is in the range of about 1 V to about 10 V.

Example 14. The method of Example 12, wherein the constant voltage is about 4 V.

Example 15. The method of Example 11, wherein providing a voltage comprises applying a multi-step voltage.

Example 16. The method of Example 15, wherein applying the multi-step voltage comprises applying first voltage and then applying a second voltage.

Example 17. The method of Example 16, wherein the first voltage is in the range of about 1 V to about 10 V.

Example 18. The method of Example 16, wherein the second voltage is in the range of about 1 V to about 10 V.

Example 19. The method of Example 16, wherein the first voltage is about 3.9 V, and the second voltage is about 4.1 V.

Example 20. The method of Example 11, wherein the electrolyte solution comprises a lithium salt.

Example 21. The method of Example 20, wherein the lithium salt comprises at least one of lithium chloride, lithium carbonate, lithium fluoride, lithium hexafluoride, lithium bis(trifluoromethanesulfonyl)imide, or lithium chlorate.

Example 22. The method of Example 11, wherein the relithiating further comprises:
preventing the layer of lithium and the portion of the electrode from touching.

Example 23. The method of Example 22, wherein the preventing comprises positioning a polymer between the layer of lithium and the portion of the electrode.

Example 24. The method of Example 23, wherein the polymer comprises a plastic.

Example 25. The method of Example 24, wherein the plastic comprises at least one of polyethylene, polypropylene, or polystyrene.

Example 26. The method of Example 22, wherein the preventing comprises positioning a spring in the chamber.

Example 27. The method of Example 26, wherein the spring is configured to provide a force on a plate.

Example 28. The method of Example 27, wherein the plate is configured to contact the layer of lithium.

Example 29. The method of Example 11, wherein the layer of lithium comprises a lithium foil.

Example 30. A device for repurposing a jelly roll lithium-ion battery, the device comprising:
- a first pin configured to secure a first end an electrode of the jelly roll lithium-ion battery;
- a second pin configured to secure a second end of the electrode;
- a chamber containing a layer of lithium and an electrolyte solution and positioned between the first pin and the second pin; and
- a terminal configured to provide a voltage to the layer of lithium; wherein:
  - at least a portion of the electrode is configured to extend through the chamber, and
  - the voltage is configured to motivate at least one lithium ion to move from the layer of lithium, through the electrolyte solution, and to the electrode.

Example 31. The device of Example 30, wherein the electrode is a cathode or a material capable of performing as a cathode.

Example 32. The device of Example 30, wherein:
the electrolyte solution comprises a lithium salt.

Example 33. The device of Example 32, wherein:
the lithium salt comprises at least one of lithium chloride, lithium carbonate, lithium fluoride, lithium hexafluoride, lithium bis(trifluoromethanesulfonyl)imide, or lithium chlorate.

Example 34. The device of Example 30, further comprising:
a polymer positioned between the layer of lithium and the portion of the electrode.

Example 35. The device of Example 34, wherein:
the polymer comprises a plastic.

Example 36. The device of Example 35, wherein:
the plastic comprises at least one of polyethylene, polypropylene, or polystyrene.

Example 37. The device of Example 30, wherein:
the voltage comprises a constant voltage.

Example 38. The device of Example 37, wherein the constant voltage is in the range of about 1 V to about 10 V.

Example 39. The device of Example 37, wherein the constant voltage is about 4 V.

Example 40. The device of Example 30, wherein:
the voltage comprises a multi-step voltage.

Example 41. The device of Example 40, wherein the multi-step voltage comprises a first voltage and a second voltage.

Example 42. The device of Example 41, wherein the first voltage is in the range of about 1 V to about 10 V.

Example 43. The device of Example 41, wherein the second voltage is in the range of about 1 V to about 10 V.

Example 44. The device of Example 41, wherein the first voltage is about 3.9 V, and the second voltage is about 4.1 V.

Example 45. The device of Example 30, wherein the layer of lithium comprises a lithium foil.

References herein to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A method for repurposing a lithium-ion battery, the method comprising, in order:
   removing at least a portion of the electrode of the lithium battery;
   treating the portion of the electrode;
   recasting the portion of the electrode; and
   relithiating the electrode; wherein:
   the lithium-ion battery comprises a wound or jelly roll design,
   a terminal is configured to provide the voltage,
   the voltage is configured to motivate at least one lithium ion to move from the layer of lithium, through the electrolyte solution, and to the electrode, and
   the relithiating comprises:
     securing a first end of the electrode to a first pin;
     securing a second end of the electrode to a second pin;
     positioning a chamber containing a layer of lithium and an electrolyte solution between the first pin and the second pin; and
     extending at least a portion of the electrode through the chamber.

2. The method of claim 1, wherein the electrode comprises a cathode or a material capable of performing as a cathode.

3. The method of claim 1, wherein the treating comprises exposing the portion of the electrode to a solvent.

4. The method of claim 3, wherein the solvent comprises a ketone.

5. The method of claim 4, wherein the ketone comprises acetone.

6. The method of claim 3, wherein the exposing comprises at least one of sonicating, stirring, or soaking the portion of the electrode in the solvent.

7. The method of claim 1, wherein:
the lithium-ion battery comprises a layer of foil, and
the removing comprises scraping the electrode from the layer of foil.

8. The method of claim 1, wherein:
the lithium-ion battery comprises a layer of foil, and
the recasting comprises attaching the electrode on the layer of foil.

9. A device for repurposing a jelly roll lithium-ion battery, the device comprising:
a first pin configured to secure a first end an electrode of the jelly roll lithium-ion battery;
a second pin configured to secure a second end of the electrode;
a chamber containing a layer of lithium and an electrolyte solution and positioned between the first pin and the second pin; and
a terminal configured to provide a voltage to the layer of lithium; wherein:
at least a portion of the electrode is configured to extend through the chamber, and
the voltage is configured to motivate at least one lithium ion to move from the layer of lithium, through the electrolyte solution, and to the electrode.

10. The device of claim 9, wherein the electrode is a cathode or a material capable of performing as a cathode.

11. The device of claim 9, wherein:
the electrolyte solution comprises a lithium salt.

12. The device of claim 11, wherein:
the lithium salt comprises at least one of lithium chloride, lithium carbonate, lithium fluoride, lithium hexafluoride, lithium bis(trifluoromethanesulfonyl)imide, or lithium chlorate.

13. The device of claim 9, further comprising:
a polymer positioned between the layer of lithium and the portion of the electrode.

14. The device of claim 13, wherein:
the polymer comprises at least one of polyethylene, polypropylene, or polystyrene.

15. The device of claim 9, wherein:
the voltage comprises a constant voltage.

16. The device of claim 15, wherein the constant voltage is in the range of about 1 V to about 10 V.

17. The device of claim 9, wherein the chamber comprises a substantially inert and non-corrosive material.

18. The device of claim 17, wherein the chamber comprises polytetrafluoroethylene (PTFE).

* * * * *